(12) United States Patent
Eichel et al.

(10) Patent No.: US 12,354,351 B2
(45) Date of Patent: Jul. 8, 2025

(54) AUTOMATIC AND SEMI-AUTOMATIC TRAFFIC CONFIGURATION SYSTEM

(71) Applicant: Miovision Technologies Incorporated, Kitchener (CA)

(72) Inventors: Justin Alexander Eichel, Kitchener (CA); Chu Qing Hu, Newmarket (CA); Fatemeh Mohammadi, Waterloo (CA); David Martin Swart, Waterloo (CA)

(73) Assignee: Miovision Technologies Incorporated, Kitchener (CA)

( * ) Notice: Subject to any disclaimer, the term of this patent is extended or adjusted under 35 U.S.C. 154(b) by 115 days.

(21) Appl. No.: 17/529,455

(22) Filed: Nov. 18, 2021

(65) Prior Publication Data
US 2022/0165060 A1 May 26, 2022

Related U.S. Application Data

(60) Provisional application No. 63/198,907, filed on Nov. 20, 2020.

(51) Int. Cl.
*G06V 20/40* (2022.01)
*G06V 10/762* (2022.01)
(Continued)

(52) U.S. Cl.
CPC ............ *G06V 20/41* (2022.01); *G06V 10/762* (2022.01); *G06V 20/54* (2022.01); *G06V 20/64* (2022.01); *G06V 2201/08* (2022.01)

(58) Field of Classification Search
CPC ........ G08G 1/0129; G06T 2207/10016; G06T 2207/30236; G06F 18/214; G06V 10/82;
(Continued)

(56) References Cited

U.S. PATENT DOCUMENTS 6,339,383 B1 1/2002 Kobayashi et al.
6,724,320 B2 4/2004 Basson et al.
(Continued)

FOREIGN PATENT DOCUMENTS

WO 2020069517 A2 4/2020

OTHER PUBLICATIONS

S. R. E. Datondji, Y. Dupuis, P. Subirats and P. Vasseur, "A Survey of Vision-Based Traffic Monitoring of Road Intersections," in IEEE Transactions on Intelligent Transportation Systems, vol. 17, No. 10, pp. 2681-2698, Oct. 2016, doi: 10.1109/TITS.2016.2530146. (Year: 2016).*

(Continued)

*Primary Examiner* — Andrew M Moyer
*Assistant Examiner* — Ahmed A Nasher
(74) *Attorney, Agent, or Firm* — CPST Intellectual Property Inc.; Brett J. Slaney

(57) ABSTRACT

There is provided a method of refining a configuration for analyzing video. The method includes deploying the configuration to at least one device positioned to capture video of a scene; receiving data from the at least one device; using the data to automatically refine the configuration; and deploying a refined configuration to the at least one device. There is also provided a method for automatically generating a configuration for analyzing video. The method includes deploying at least one device without an existing configuration; running at least one computer vision algorithm to detect vehicles and assign labels; receiving data from the at least one device; automatically generating a configuration; and deploying the configuration to the at least one device.

20 Claims, 27 Drawing Sheets

(51) Int. Cl.
*G06V 20/54* (2022.01)
*G06V 20/64* (2022.01)

(58) Field of Classification Search
CPC .... G06V 20/41; G06V 10/7715; G06V 20/54; G06V 2201/08
See application file for complete search history.

(56) References Cited

U.S. PATENT DOCUMENTS

| | | | |
|---|---|---|---|
| 9,633,560 | B1 | 4/2017 | Gao et al. |
| 9,672,733 | B2 | 6/2017 | Lynar et al. |
| 9,761,131 | B2 | 9/2017 | Robinson |
| 11,068,713 | B1* | 7/2021 | Li .................... G06V 20/17 |
| 2007/0273552 | A1 | 11/2007 | Tischr |
| 2008/0094250 | A1 | 4/2008 | Myr |
| 2009/0138187 | A1 | 5/2009 | Mathias |
| 2010/0172240 | A1 | 7/2010 | Suzuki et al. |
| 2013/0013179 | A1 | 1/2013 | Lection et al. |
| 2013/0058523 | A1* | 3/2013 | Wu .................... G06V 20/54 382/103 |
| 2020/0159232 | A1* | 5/2020 | Refaat ................ G06V 20/54 |
| 2021/0065548 | A1* | 3/2021 | Li .................... G01C 21/3629 |
| 2024/0185300 | A1* | 6/2024 | Bird ................ G06Q 30/0266 |
| 2024/0272637 | A1* | 8/2024 | Liu .................... G05D 1/644 |

OTHER PUBLICATIONS

Robert P. Loce; Raja Bala; Mohan Trivedi, "Traffic Flow Analysis," in Computer Vision and Imaging in Intelligent Transportation Systems , IEEE, 2017, pp. 131-162, doi: 10.1002/9781118971666. ch6. (Year: 2017).*

Miller, Nicholas et al.; "Lane Discovery in Traffic Video"; https://openjournals.uwaterloo.ca/index.php/vsl/article/view/125/111; Miovision Technologies Incorporated; Retrieved from the Internet Nov. 3, 2020.

Sochor, Jacob; "Fully Automated Real-Time Vehichles Detectionand Tracking with Lanes Analysis"; https://old.cescg.org/CESCG-2014/papers/Sochor-Fully_Automated_Real-Time_Vehicles_Detection_and_Tracking_with_Lanes_Analysis.pdf; Retrieved from the Internet Nov. 3, 2020.

International Search Report issued in related PCT Application No. PCT/CA2021/051628; Search completed Feb. 14, 2022.

Zhao, et al., "Detection and Tracking of Moving Objects at Intersctions Using a Network of Laser Scanners". IEEE Transactions on Intelligent Transportation Systems, Dec. 1, 2011 (Dec. 1, 2011), Vo 13(s), pp. 655-670.

Zhao, et al., "Sensing an Intersection Using a Network of Laser Scanners and Video Cameras", IEEE Intelligent Transportation Systems Magazine, vol. 1, No. 2, pp. 31-37, Summer 2009, doi: 10.1109/MITS.2009.933864.

Hosseinzadeh et al., "Learing vehicle motion patterns based on environmental model and vehicle trajectories". IEEE Xplore, Apr. 21, 2014 (Apr. 21, 2014), ISSN 978-1-4799-3351-8.

Extended European Search Report issued in related European Patent Application No. 21893175; Search completed Aug. 27, 2024.

Wan Yiwen et al: "Camera calibration and vehicle tracking: Highway traffic video analytics", Transportation Research Part C:Emerging Technologies, vol. 44, Jul. 1, 2014 (Jul. 1, 2014), pp. 202-213, XP029032763.

Datondji Sokemi Rene Emmanuel et al: "A Survey of Vision-Based Traffic Monitoring of Road Intersections", IEEE Transactions on Intelligent Transportation Systems, IEEE, Piscataway, NJ, USA, vol. 17, No. 10, Oct. 1, 2016 (Oct. 1, 2016), pp. 2681-2698, XP011624493.

Shirazi Mohammad Shokrolah et al: "Looking at Intersections: A Survey of Intersection Monitoring, Behavior and Safety Analysis of Recent Studies", IEEE Transactions on Intelligent Transportation Systems, IEEE, Piscataway, NJ, USA, vol. 18, No. 1, Jan. 1, 2017 (Jan. 1, 2017), pp. 4-24, XP011637613.

* cited by examiner

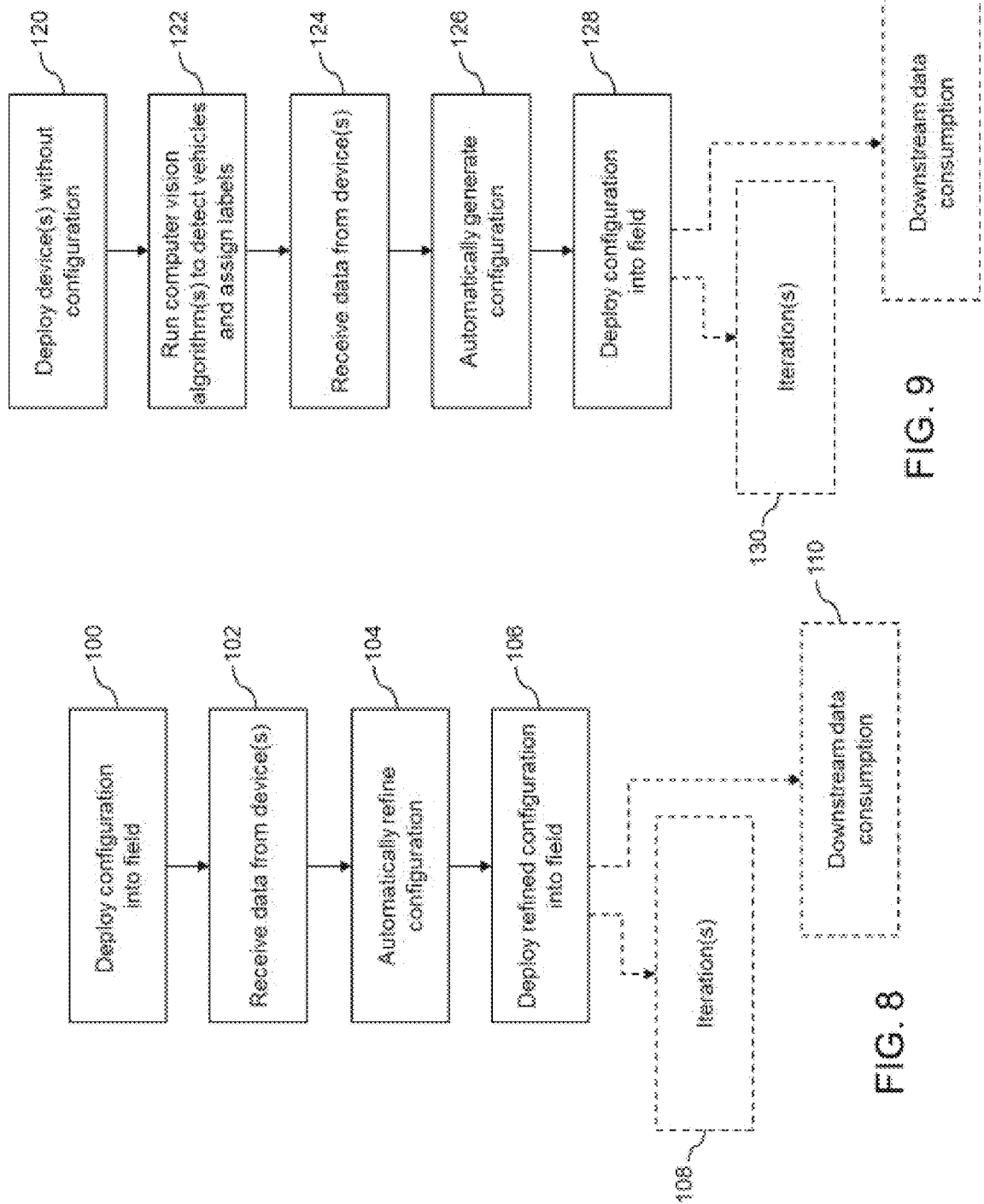

AUTOMATIC AND SEMI-AUTOMATIC TRAFFIC CONFIGURATION SYSTEM

CROSS-REFERENCE TO RELATED APPLICATION(S)

This application claims priority to U.S. Provisional Patent Application No. 63/198,907 filed on Nov. 20, 2020, the contents of which are incorporated herein by reference.

TECHNICAL FIELD

The following relates generally to video configurations, in particular to automatically and/or semi-automatically configuring video for analyzing traffic video.

BACKGROUND

Video analytics has become a popular tool for Intelligent Transportation Systems (ITSs). In such systems, video can be used by roadside systems to detect vehicles, track objects through a scene, generate analytics, and respond in real-time. Computer vision algorithms are commonly used to detect and track vehicles through the scene. To generate accurate analytics and to properly respond to events, the system is required to miss very few vehicles and to rarely overcount. Therefore, ensuring that the vehicle is in the correct lane or mapped to the correct movement is considered important.

Video can present a problem in that the physical camera needs to be properly registered to a reference point in the real-world and everything that is configured in the video needs to match the behavior of the vehicles. For instance, if a vehicle is in a right lane, but the camera shifts or if the user configures the right lane and left lanes in a way that is ambiguous to the data, the system is likely unable to confidently respond to the vehicle. That is, the system would not know for sure if the vehicle is turning right or left. While these types of configurations are possible to do "by hand", they are time-consuming and/or can be inaccurate. In many cases, the user performing the configuration may not even be able to understand how the computer vision algorithm is tracking the vehicle, let alone be able to design a configuration that best works with that algorithm.

Challenges with configurations can also include dealing with multiple views from a single camera, which challenges are common with wide or fisheye lenses, zooming concerns, and multiple cameras covering the same scene. Cameras with a large field of view might be split into several views for easier computer vision processing. For zooming, the configuration needs to be mindful of optical resolution limits, computer vision algorithm resolution requirements, the different sizes of vehicles, and the different behavior of vehicles. For instance, pedestrians and bikes are smaller than trucks and buses and may require more or less magnification depending on the camera setup, lens properties, and actual scene composition. In some cases, the path of the vehicle through the scene might need to be captured at the appropriate magnification so that the entire path, or only part of the path, is in view. In other cases, multiple cameras may cover the same scene, so tradeoffs between resolution and occlusion issues need to be determined.

For all of these cases, the user's primary concern is typically to figure out what they want to count, actuate, or process, but if only a manual process is available, they have a large number of factors to consider, which require a non-trivial understanding of the underlying computer vision algorithms.

SUMMARY

An automatic camera-based system for traffic engineering and ITS applications is considered to be important in obtaining reliable data and ensuring that vehicles are detected, for example, so as not to sit idle at red lights indefinitely. The following provides a system that is configured to assist with, and/or eliminate the need for, a user to understand the internals of the computing system by assisting and/or fully automating the video configuration process. In this way, for example, the system may only require the user to map what events they want the system to output, not necessarily how they want the system to generate the events. Semi-automated methods are also enabled in the system described herein.

In one aspect, there is provided a method of refining a configuration for analyzing video, comprising: deploying the configuration to at least one device positioned to capture video of a scene; receiving data from the at least one device; using the data to automatically refine the configuration; and deploying a refined configuration to the at least one device.

In another aspect, there is provided a method for automatically generating a configuration for analyzing video, comprising: deploying at least one device without an existing configuration; running at least one computer vision algorithm to detect vehicles and assign labels; receiving data from the at least one device; automatically generating a configuration; and deploying the configuration to the at least one device.

In yet another aspect, there is provided a method of semi-automatically generating a configuration for analyzing video, comprising: obtaining video content to be analyzed; applying at least one automated computer vision technique to the video content to automatically generate at least one track; enabling, via a user interface, entrances to and exits from an intersection recorded in the video content to be identified; performing automated track assignment and, if necessary, automated track clustering to generate a movement template; and outputting the movement template.

In yet another aspect, there is provided a method of automatically splitting a video view, comprising: applying a view fitting method to a video to find a best view projection from a set of configuration elements; determining a score and corresponding view projection parameters for any set of configuration elements and any available views from the video; formulating a large scale optimization problem to assign configuration elements to views; and identifying feasible and/or maximum view fitting scores per view.

In yet another aspect, there is provided a method of automatically assigning cameras, comprising: obtaining a configuration with a plurality of cameras; applying one or more camera-dependent properties to the configuration elements; and assigning the configuration elements to a camera with the best view of that element.

In yet another aspect, there is provided a method of automatically assigning a camera, comprising: detecting an incorrect vehicle track; applying an optimization formula to determine a camera parameter error; and determining one or more camera calibration parameter changes.

In other aspects, there are provided a computer readable media and system(s) for performing the above methods.

BRIEF DESCRIPTION OF THE DRAWINGS

Embodiments will now be described with reference to the appended drawings wherein:

FIG. 8 is a flow chart illustrating computer executable operations performed in refining a video configuration.

FIG. 9 is a flow chart illustrating computer executable operations performed in generating a new video configuration from device data.

DETAILED DESCRIPTION

Figure 1:
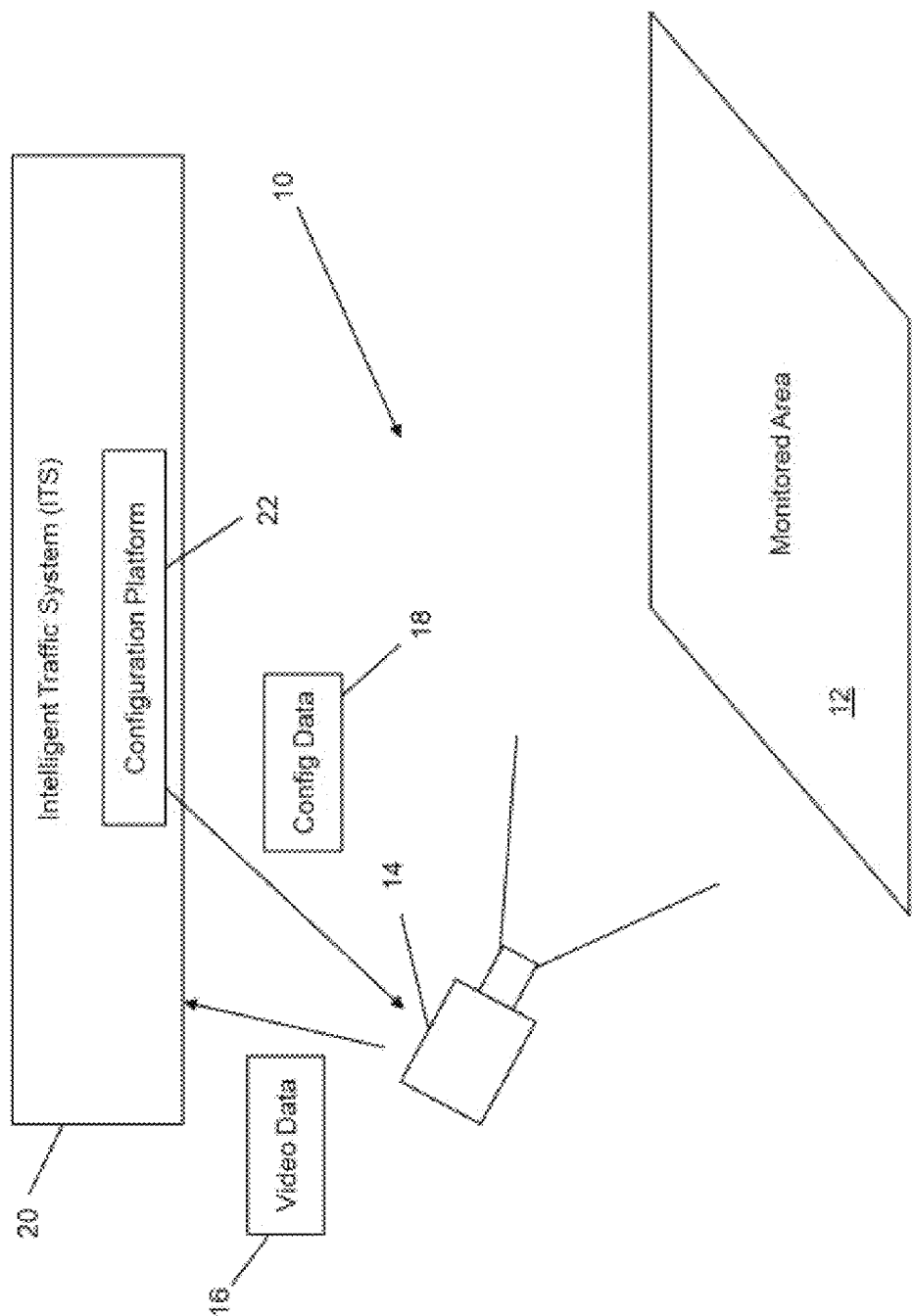
FIG. 1 is a block diagram of a system for a traffic video analytics system.

Turning now to the figures, FIG. 1 illustrates a video-based system 10 for monitoring, analyzing, and/or controlling elements of or in a monitored area 12, e.g., a traffic intersection using video captured at or near the monitored area 12. A video capturing device 14, such as a camera or other device having a camera captures video to generate video data 16 associated with the monitored area 12. The video data 16 can be locally stored by the video capture device 14 (e.g., using an internal or externally coupled storage device). The video data 16 can also be transmitted over a communication channel to a cloud system, e.g., a processing server, network infrastructure, etc. In this example, the cloud system is a cloud-based intelligent traffic system (ITS) 20. The communication channel between the video capture device 14 and the ITS 20 can include a wired, wireless, or manual delivery channel capable of transporting the video data 16 from the image capture device 14 to the ITS 20 for subsequent usage and/or processing. For example, a cellular network can be used for wireless transmission, a fiber optic network can be used for wired transmission, and a portable media device (e.g., universal serial bus (USB) drive) can be used for manual transportation of the video data 16.

The ITS 20 can include a configuration platform 22 used to create and/or improve video configurations utilized in analyzing video captured by the video capture device 14, which can be performed by the ITS 20 or another system. The configuration platform 22 can also communicate with the video capture device 14 to push out video configuration data 18.

Figure 2:
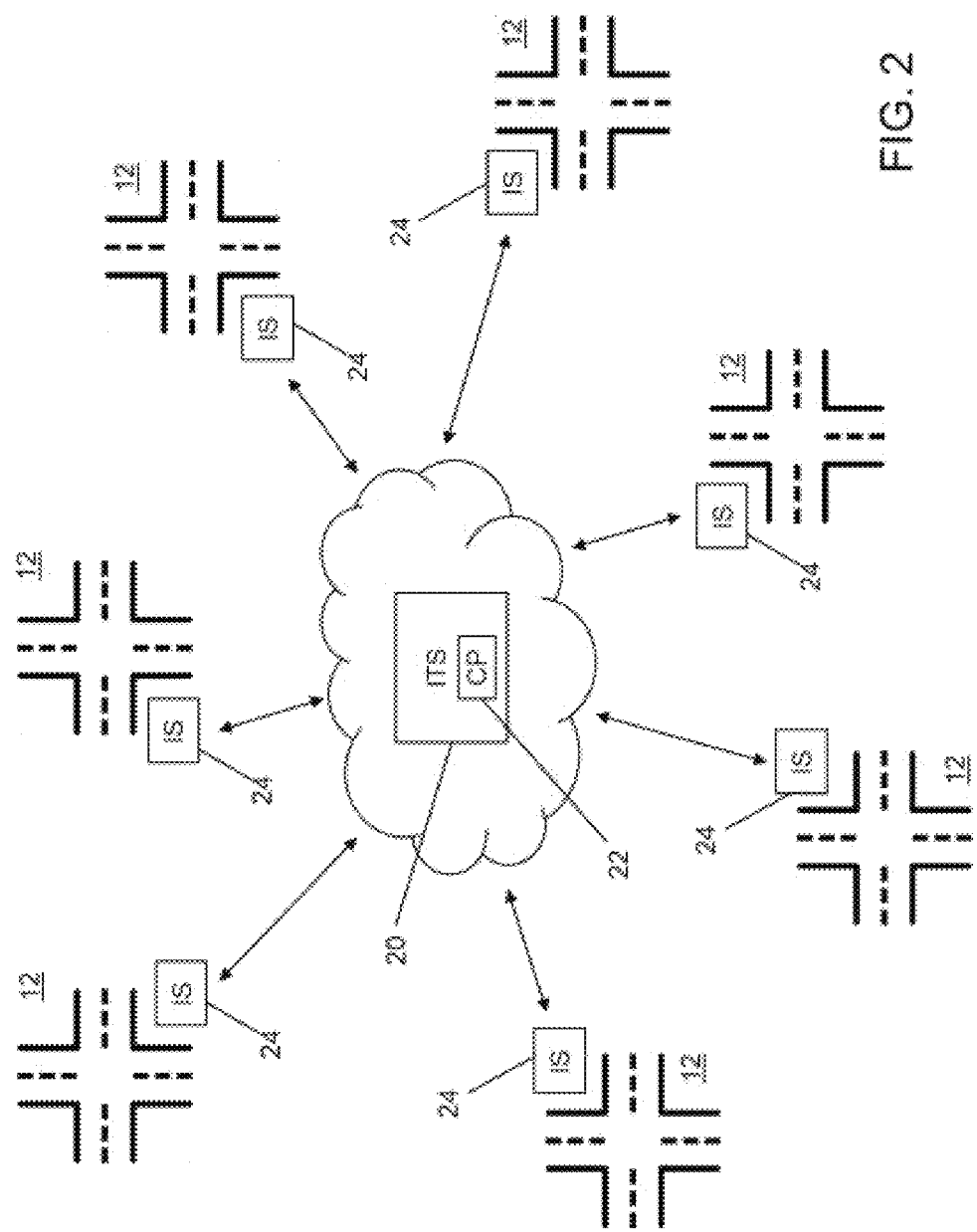
FIG. 2 is a schematic diagram of a traffic video analytics system connecting to a series of intersections.

FIG. 2 illustrates a wider view of a traffic monitoring and/or control system in which a cloud-based ITS 20 and configuration platform 22 are in communication with a number of intersections 12, each having an intersection system (IS) 24. Each IS 24 in this example can include one or more video capture devices 24 for capture video associated with the corresponding intersection 12. The connectivity shown in FIG. 2 enables the configuration platform (CP) 22 and ITS 20 to bi-directionally communicate with the ISs 24 and to send or receive data to/from the ISs 24, e.g., video data 16 and configuration data 18 as illustrated in FIG. 1.

Figure 3:
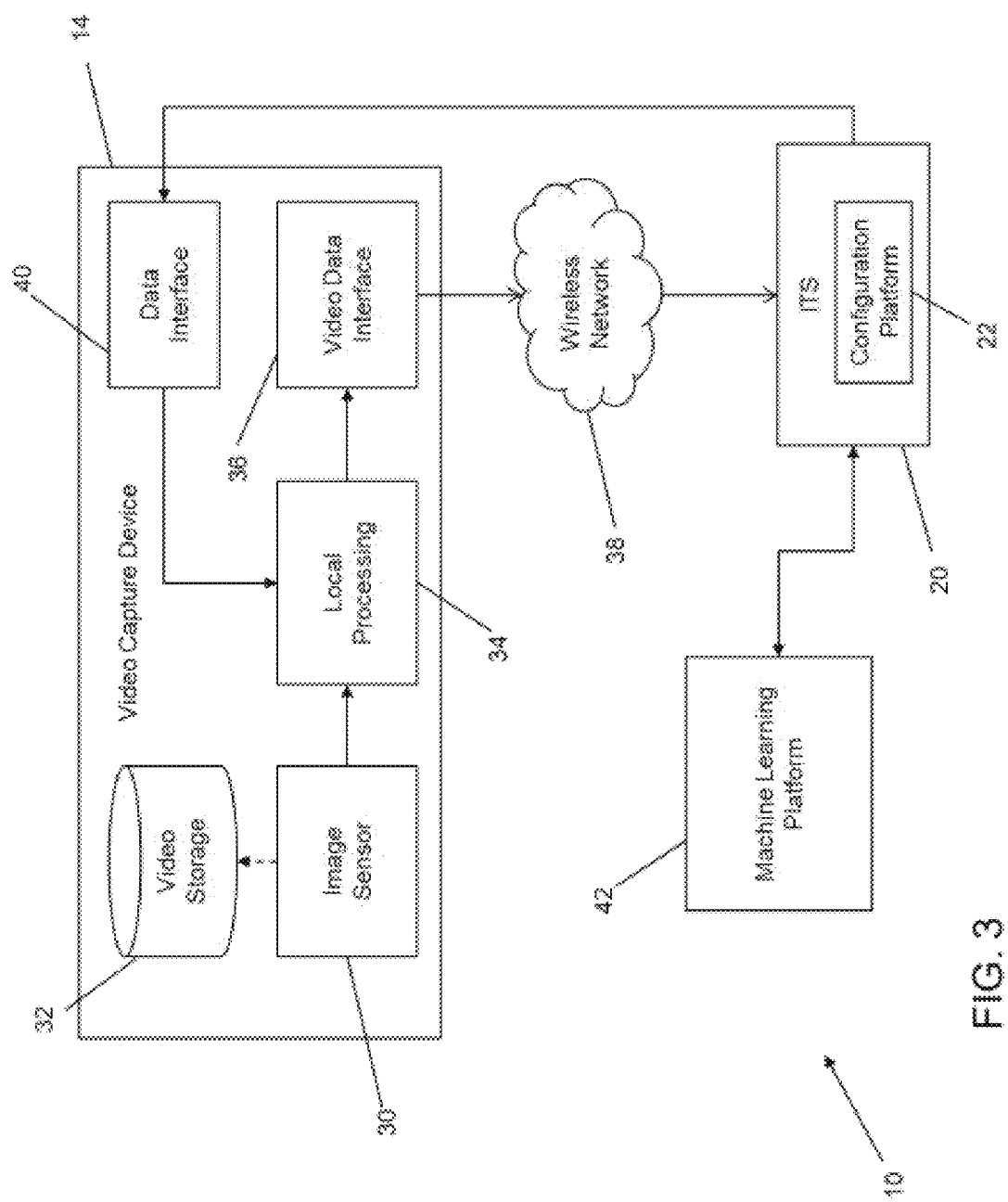
FIG. 3 is a block diagram of a video capture device located at an intersection.

FIG. 3 illustrates an example of a configuration for the video capture device 14. In this example, the video capture device 14 includes an image sensor 30 for capturing a series of images to generate the frames of a video, and a local processing module 34 for performing local processing functions such as object of interest extraction, compression, etc. The local processing module 34 can also use a video data interface 36 to send video to the ITS 20 via a wireless network 38. As shown in FIG. 2, the video capture device 14 can also include a data interface 40 for receiving communications and/or data from, among other things, the ITS 20 and configuration platform 22. It can be appreciated that the video data interface 36 and data interface 40 are shown as separate components for illustrative purposes only and both modules and/or functionalities can be implemented using a single device, e.g., a transceiver configured to wirelessly transmit video data and to wirelessly receive configuration or update data via one or more wireless networks 38.

FIG. 3 also includes a machine learning platform 42 that can be utilized to have the configuration data 18 generated by the configuration platform 22 updated and/or refined as data is captured and processed by the system 10. The machine learning platform 42 can be used to take advantage of a validation stage in a traffic analytics system to provide meaningful data in a database for determining the accuracy of the tracks and objects detected in a video. This meaningful data, processed on a large scale, allows the machine learning platform 42 to train the analysis system to which it is coupled towards better classifiers for the objects being detected.

Figure 4:
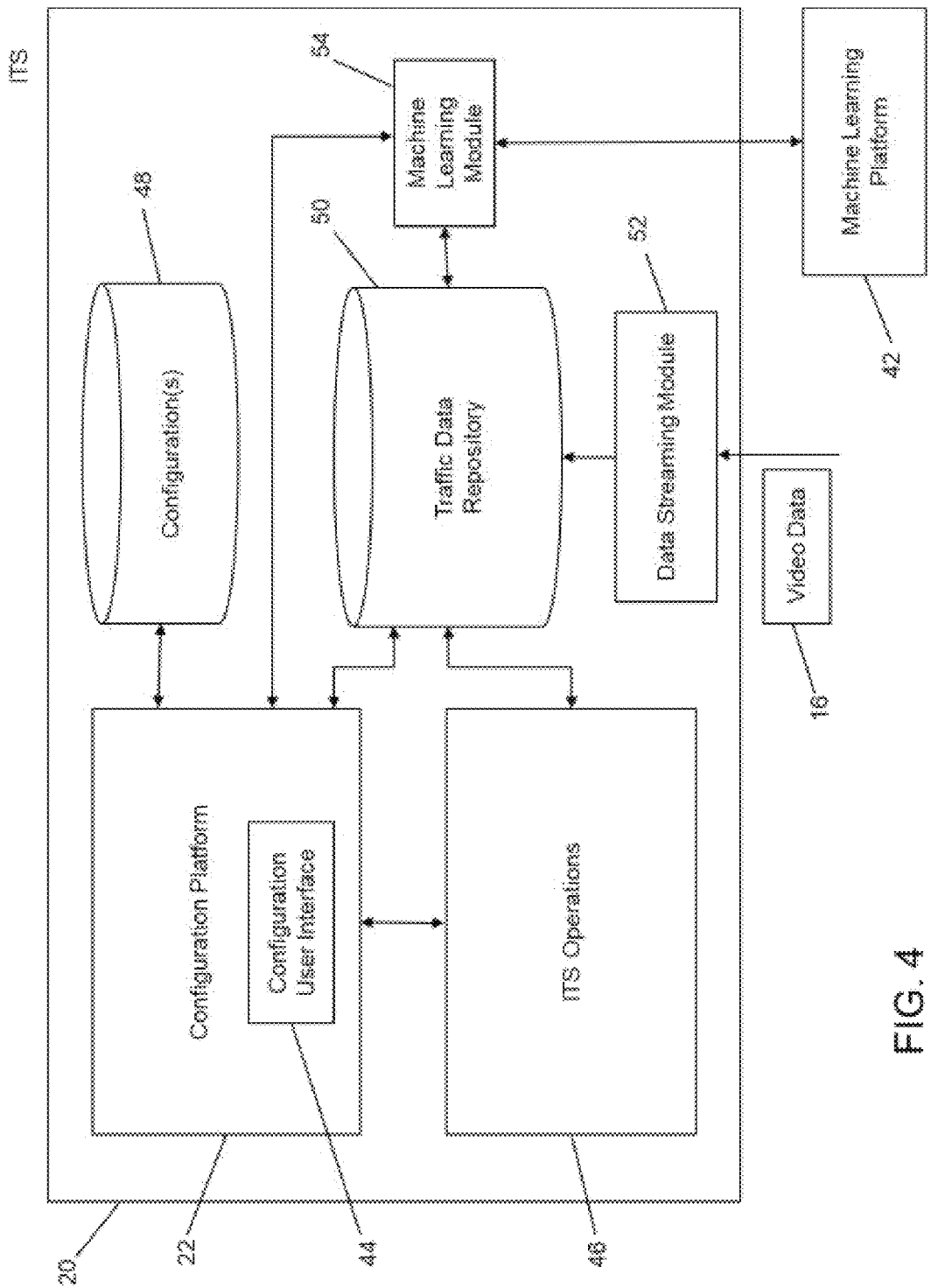
FIG. 4 is a block diagram of an intelligent traffic system (ITS).

FIG. 4 illustrates a configuration for an ITS 20. In this example, the ITS 20 includes or otherwise has access to the configuration platform 22, which includes a configuration user interface 44 that can be used by personnel to create, refine and deploy video configurations to the IS 24 without necessarily having an understanding of the underlying algorithms used to detect objects of interest in the video data 16. The configuration platform 22 can have access to a datastore of video configurations 48 that can be deployed to devices and refined over time. The configurations 48 generated by the configuration platform 22 can also be used by one or more other ITS operations 46 such as traffic control, traffic analytics, traffic or infrastructure planning, or other applications that use the video data 16.

The video data 16 that is received from the video capture device(s) 14 is received by a data streaming module 52 that is configured to provide a communication interface between the ITS 20 and the wired and/or wireless networks used by the ISs 24 to stream or otherwise send or transport the video data 16 to the ITS 20. The data streaming module 52 stores the video data 16 in a traffic data repository 50 for use by the ITS operations 46 and configuration platform 22. The ITS 20 in this example also includes a machine learning module 54 to locally access and analyze the video data 16 from the data repository 50 for and/or with the machine learning platform 42. It can be appreciated that the machine learning platform 42 and machine learning module 54 are shown separately as local- and remote-based elements for illustrative purposes and can be arranged in different configurations in order to perform machine learning on or using the video data 16 in the traffic data repository 50.

Figure 5:
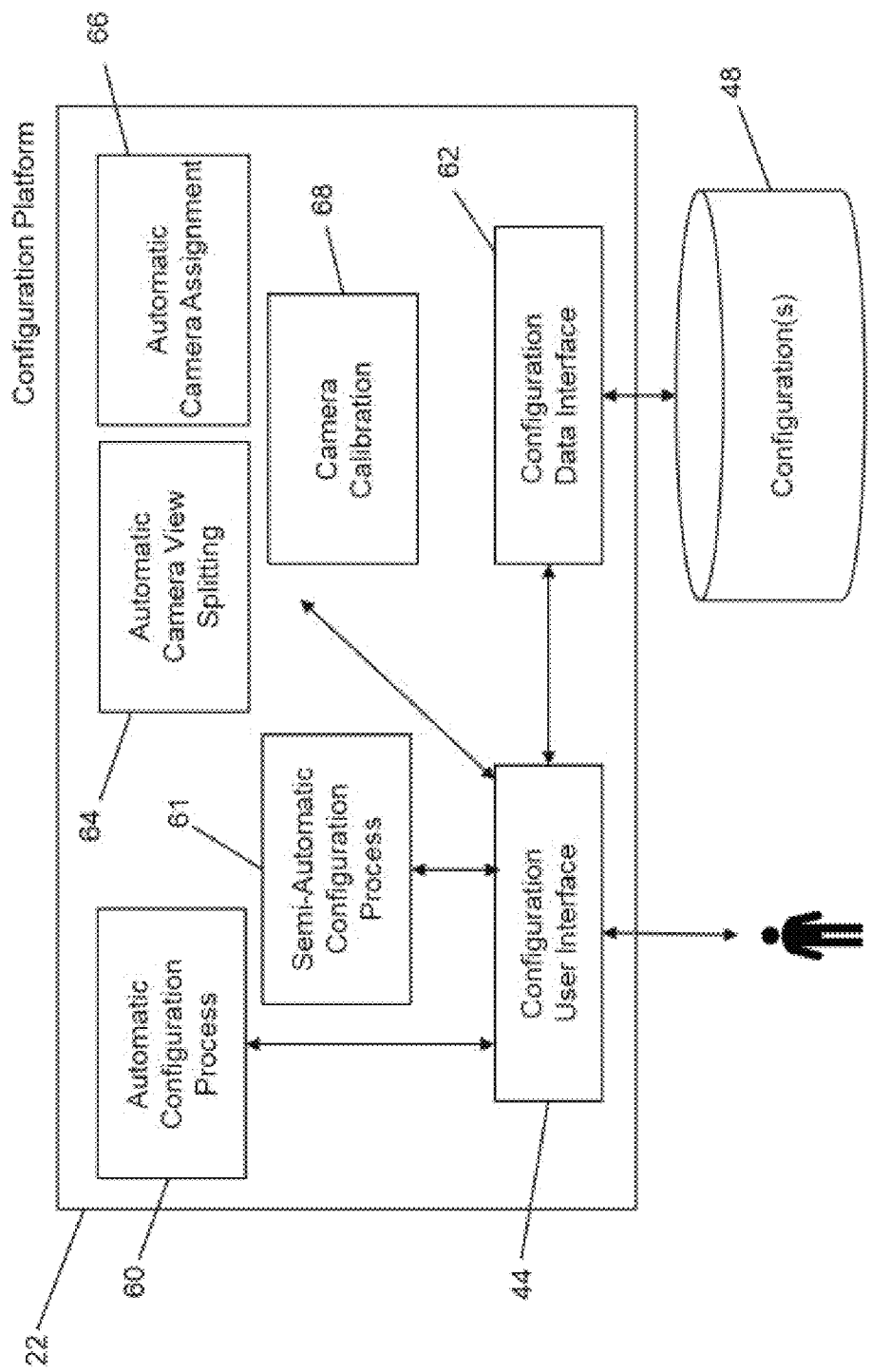
FIG. 5 is a block diagram of a configuration platform that can be used by or within an ITS.

The configuration platform 22 is shown in greater detail in FIG. 5. The configuration platform 22 can include the configuration user interface 44 to enable users to interact with the configuration platform 22, e.g., to create or refine a video configuration. The configuration platform 22 can also include a configuration data interface 62 to interface with the datastore of configurations 48. The configuration platform 22 is used to create and/or refine a video configuration in a partial, semi- or fully-automated fashion. This can be done using an automatic configuration process 60 and/or semi-automatic configuration process 61 that can be directed by, approved by and controlled by the user. The user and/or the system 10 can also use the configuration platform 22 to execute an automatic camera view splitting process 64, an automatic camera assignment process 66 and a camera calibration process 68. Each of these processes can be considered a system "configuration" that can be generated and deployed to the ISs 24. The configuration platform 22 is therefore included in the ITS 20 or is otherwise provided in the system 10 to use data streamed by the video capture devices 14 to create or improve configurations. That is, the system 10 described herein uniquely leverages data gathered from devices to improve video and camera configurations and settings. The system 10 can also be configured as shown in FIG. 2 to enable the ITS 20 or configuration platform 22 to deploy updated configurations to devices in the field such as the ISs 24.

Figure 7:
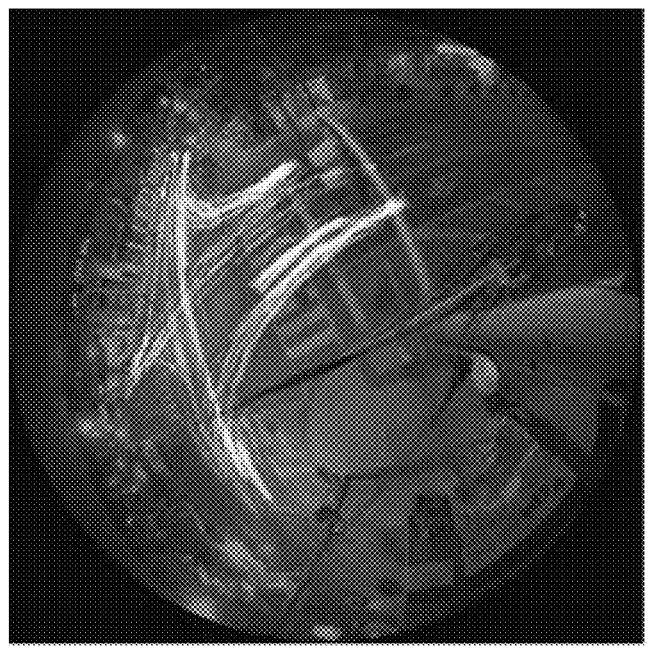
FIG. 7 is a heatmap showing vehicle movements through an intersection.
Figure 6:
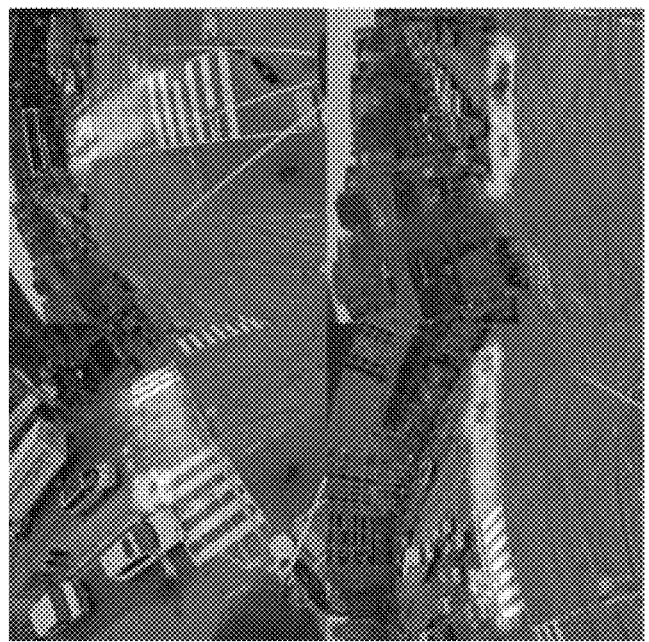
FIG. 6 includes a series of heat map images generated from a traffic video.

To determine the best positioning and locations where vehicles and people stop in the scene, heatmaps and trackmaps can be used. Referring now to FIGS. 6 and 7, example heatmaps are shown. The heatmaps are cold/hot views of frequent locations that vehicles or people travel within the frame of a video. The heatmaps can be used to see the vehicle or pedestrian paths and also the amount of time an object stays in a location. These heatmaps provide information on exactly where vehicles stop on the roadway so that a detection zone can be created through automation or manual efforts. Using the gradient information contained in the image and/or from the tracks, they also provide vehicle movements that may not be obvious without this data initially. Often, manual configurations fail to annotate driveways or even subdivision entryways so having a heatmap calls attention to regions where there is significant data but no corresponding movement. These movements can be automatically generated from the heatmaps and trackmaps. The heatmaps can even provide areas where pedestrians are waiting and, through automatic configuration, can be used to trigger a crosswalk or even simply an alert or count of people walking in dangerous areas in a city. For example, a heatmap for a path can be used by a transit station to count pedestrians entering in unintended areas of the station and even prompt a redesign of a platform based on the paths pedestrians take. That is, the heatmaps and trackmaps can provide a mechanism to automatically generate these configurations and to identify paths that the platform or roadway designer did not initially consider.

Automatic Configuration

The automatic configuration process 60 shown in FIG. 5 can be used to perform a data-driven configuration refinement process as well as a data-driven configuration creation process. Referring to FIG. 8, a configuration refinement process is shown. There are several use cases for refining an existing configuration. For instance, if the scene changes over time, the configuration can adapt to changes in how vehicles behave or even changes due to road conditions, road obstructions, construction, or permanent layout changes. Furthermore, the system 10 can provide different configurations depending on the vehicle type. Trucks, for instance, might follow a different path to take a right turn than a passenger vehicle. From these configurations, it is also possible to create informed vehicle models, such as a typical turning radius, exactly where vehicles stop when entering an intersection, or stopping distance for vehicle types. These stats and values are not only useful for configuration refinement, but also for safety analytics and other analyses that can be conducted downstream of the configuration platform 22, e.g., as part of an ITS operation 46.

As shown in FIG. 8, the data-driven configuration refinement process begins at 100 by deploying a configuration into the field, by providing the configuration to the video capture device(s) 14. A "configuration" provides a way to tell the machine processing algorithm what the algorithm needs to look for in the scene. A configuration can tell a device deployed at an intersection to process streamed video, live, and map results to actuation channels in the traffic controller; or a configuration can instruct the algorithm to process a video file offline and map the results into a database that can be queried for historic values. In both cases, the user specifies regions of interest and what they want the algorithm to do. The configuration can ask the algorithm to count all vehicles turning right, driving through, or turning left. The configuration can detect and actuate vehicles as they drive up and stop at an intersection, or pedestrians as they gather on the sidewalk to cross the street. Configurations can include interactions between cyclists and road vehicles and measure things like speed or perform various safety analytics. The important pieces are to ensure that the spatial locations of the configuration are correct, because if a left lane is not drawn where vehicles make a left turn, all of the data and downstream analytics are not going to be useful.

The assisted and fully automated configuration method ensures that the regions of interest are specified using data to get the most accurate spatial setup for a scene. Furthermore, the tooling also provides a mechanism to ensure that movements or zones of interest are not missing by making it very apparent when there is vehicle behavior, but no corresponding region of interest. For a device deployed at an intersection, the configuration can be stored as a file on the device. For an offline video file application, the configuration can be stored as a file alongside the video or stored in a database or in another representation or format.

At 102 the configuration platform 22 receives data from the device(s) 14 and automatically refines the configuration at 104. This can be done by using the automatic configuration process 60 in a refinement mode. The result produces a refined configuration, which can be deployed back into the field at 106. Optionally, the process can be iterated at 108 to further and continually refine the configuration over time. That is, the configuration refinement process can be repeated as many times as desired using the new data obtained from the automatic configuration process 60. Using this feedback, the configuration can continue to improve and adapt to changing traffic conditions. Moreover, the refined configuration can be used in one or more downstream data consumption operations at 110, for example, a user can perform a safety analytics study on the results from a refined configuration, a user can collect turning movement counts with the configuration, an intersection can actuate traffic lights based on presence zones created from the configuration, a traffic engineer can redesign an intersection based on where vehicles stop and start, or a railway station can redesign the platform based on the paths pedestrians take, to name a few.

Referring now to FIG. 9, the automatic configuration process 60 can also be used in a creation mode to create a new configuration. In many cases, a configuration may not exist beforehand. For example, a user may have just installed a system, want to get up and running as quickly as possible, and may want the system to simply "run" without any intervention whatsoever. It is also possible that the user does not know how drivers behave in a specific region, that different environments and regions have very different driving patterns including differences in stopping areas, how much drivers cut their turns, and the presence and density of pedestrians and cyclists, to name a few. From experience, there are also many cases where a configuration is set up with driving assumptions and only afterwards additional movements, some illegal, are discovered and play a large role in the results of a traffic study. A fully automated data-driven configuration can provide an initial set of configuration elements that the user can later map to downstream analytics or actionable items.

In this example, video capture devices 14 can be deployed without a configuration at 120. The devices 14 can be configured to run one or more computer vision algorithms to detect vehicles and assign labels to each vehicle indicative of a classification at 122 to generate data for the configuration platform 22. The configuration platform 22 receives data at 124 and automatically generates a configuration at 126. This can be done by using the automatic configuration process 60 in a creation mode. The result produces a video configuration, which can be deployed into the field at 128. Optionally, the process can be iterated at 130 as discussed above, to further, and continually, refine the configuration over time. Moreover, the refined configuration can be used in one or more downstream data consumption operations at 132 as discussed above.

Figure 10A:
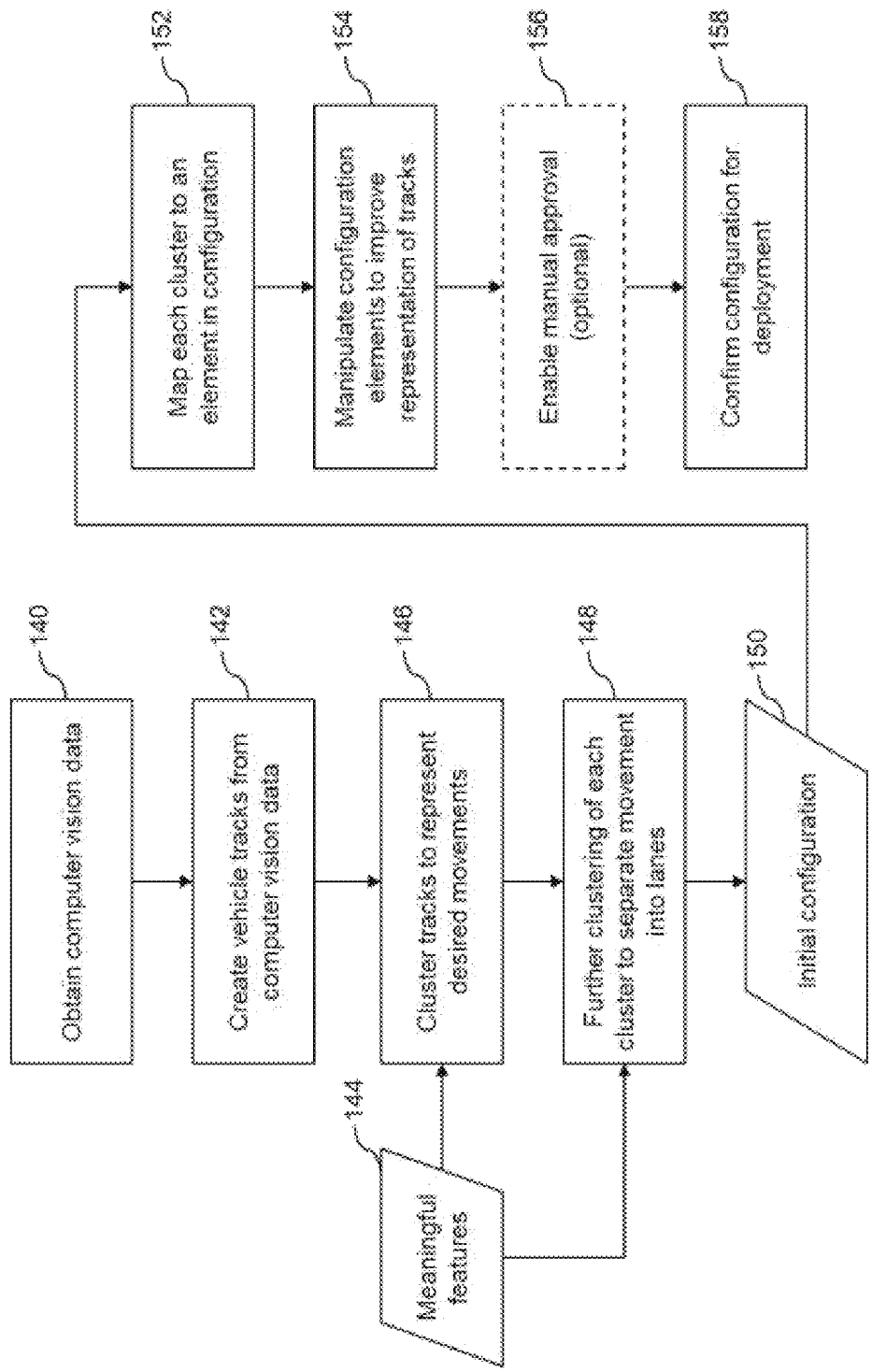
FIG. 10a is a flow chart illustrating computer executable operations performed in automatically refining a video configuration.

Further detail for an example of an automatic configuration refinement process as implemented at 104 (see FIG. 8), is shown in FIG. 10*a*. At 140 the computer vision data is obtained and at 142 vehicle tracks are created from the computer vision data. The vehicle tracks can be created using any existing tracking algorithm, such as a Kalman filter, a Hungarian matching algorithm, or a convolution neural network (CNN). Tracks can then be clustered at 146 to represent desired movements (e.g., left turn, S-to-N-bound through movements, etc.). Existing clustering algorithms, such as K-means can be used at 146. As shown in FIG. 10*a*, meaningful features 144 for the clustering algorithm can be generated ahead of time using classical computer vision techniques. Such meaningful features can be engineered features or machine learned features paired with a clustering algorithm that successfully clusters tracks into movement groups.

Figure 10B:
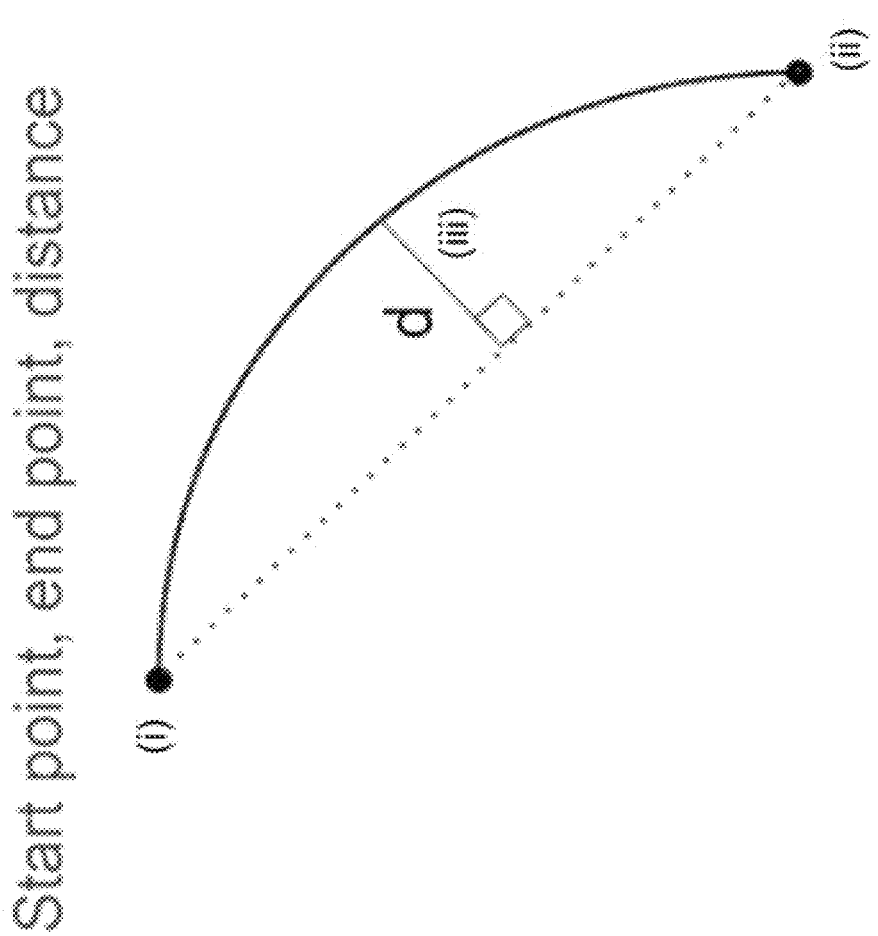
FIG. 10b illustrates a spline for representing movements.

Referring now to FIG. 10*b*, some engineered features that work well for movements and that can be represented as splines include: (i) first point on the path, (ii) last point on the path, and (iii) largest distance of a point on the path to the line segment defined by the first and last points (i), (ii). These features can capture directionality, curvature for turns and u-turns, and lane separation of movements going in the same direction. A k-means clustering algorithm using a Bayesian Gaussian Mixture model is one of many ways to find clusters of movements that represent a mappable logical movement—the mixture model is suitable because it works well with overlapping clusters that typical for more than one lane of traffic in the same direction. More generally, a number of unsupervised clustering methods and models can be applied in other applications For each cluster, further clustering can be applied at 148 to separate a movement into individual lanes, if desired. For example, a through movement may have three lanes. As with the clustering at 146, existing clustering algorithms can be used and meaningful features can be generated ahead of time using classical computer vision techniques, and can include engineered features and/or machine learned features. This generates an initial configuration 150.

Using the initial configuration 150, each cluster can be mapped and assigned to an element in the configuration, where possible at 152. For example, the initial configuration 150 may have three different left turns, the left turn that is "closest" to the tracks in a cluster is mapped to that cluster. Some clusters may not have corresponding elements in the initial configuration, these can result in alerting the user to something that is misconfigured or missing (intentionally or otherwise) from the configuration. The measure of a configuration element to a cluster track's "closeness" can be adapted by the system 10 for the traffic domain.

"Closeness" can be defined as the residual from a given loss function. Given an ensemble of paths, sampled points for each vehicle path from real-data, a model for the movement or zone can be defined and arguments for that model can be found that best fit the model to the data. A simple example would be fitting a line through some points. The challenge with these movements is that they are less well defined and that even the sampling process has noise and variability. For instance, points may be missing, so knowing where to start a line can be a challenge. Also, a line can be a very poor choice as a model in this domain. That being said, a least squares optimization methodology can still be useful using a spline, such as a b-spline, or a fourth-order polynomial as the model. To make this problem tractable, theory and experimentation lead to the choice of arguments for a spline that best fits an ensemble of paths, not points. For vehicle movements in the traffic domain, a start-point (x0, y0), a midpoint (x1, y1), and an end-point (x2, y2) where selected as the arguments for an optimization system, with an internal cubic spline model fit to those arguments, severe cost-injection (with gradients) imposed if any sampled point was beyond the start and end of the cubic splines, and the density of the ensemble points were used in a Frechet distance formulation to determine the cost function and residuals. This formulation is both used to measure the "closeness" of a given movement and also to calculate the best fitting movement from data. Using this process to generate movements from data can be easier than having the user take their best guess at where vehicles appear and travel through the scene and can be dynamically adjusted over time as new data comes in. If construction occurs, new data can impose change to the configuration file as vehicles travel different paths around construction and obstacles.

Once the initial configuration elements are mapped to the cluster tracks, the configuration elements can be manipulated at 154 to improve how well they represent the tracks. For example, the configuration element can be a spline model, which has been proven to be effective. The configuration element can also be a more complicated model such as a probability field, a density model, or a multi-modal composite of any of the above. Existing optimization methods, such as spline fitting, can be used to improve the representation. For insufficient data, this configuration element manipulation operation at 154 may do nothing and keep the initial configuration. This choice of action can be later reported to the user if desired.

Optionally, at 156, the user can be given an option to review and approve the proposed changes from the automation steps above. For example, the user can be presented with a before and after view, and without requiring any knowledge of the underlying system, may choose to accept the recommended configuration. At 158, the configuration can then be confirmed for deployment onto the device(s) 14. For deployment, validation can occur if it is desired to conduct A/B testing and, when deployed, new data can be generated using the automatically refined configuration. The A/B testing allows the user to try out a new configuration and compare it against an existing one. If the new configuration produces a more accurate representation of the world, then the new configuration replaces the old and is activated. If the old configuration is better, then the user can decide if they want to keep it entirely or replace it with elements of the new configuration. This step provides a "sanity" and data analytics measure of the benefit of the data-driven configuration. It also provides a check to ensure that the user has mapped the configuration meaningfully and labelled data correctly.

Figure 11:
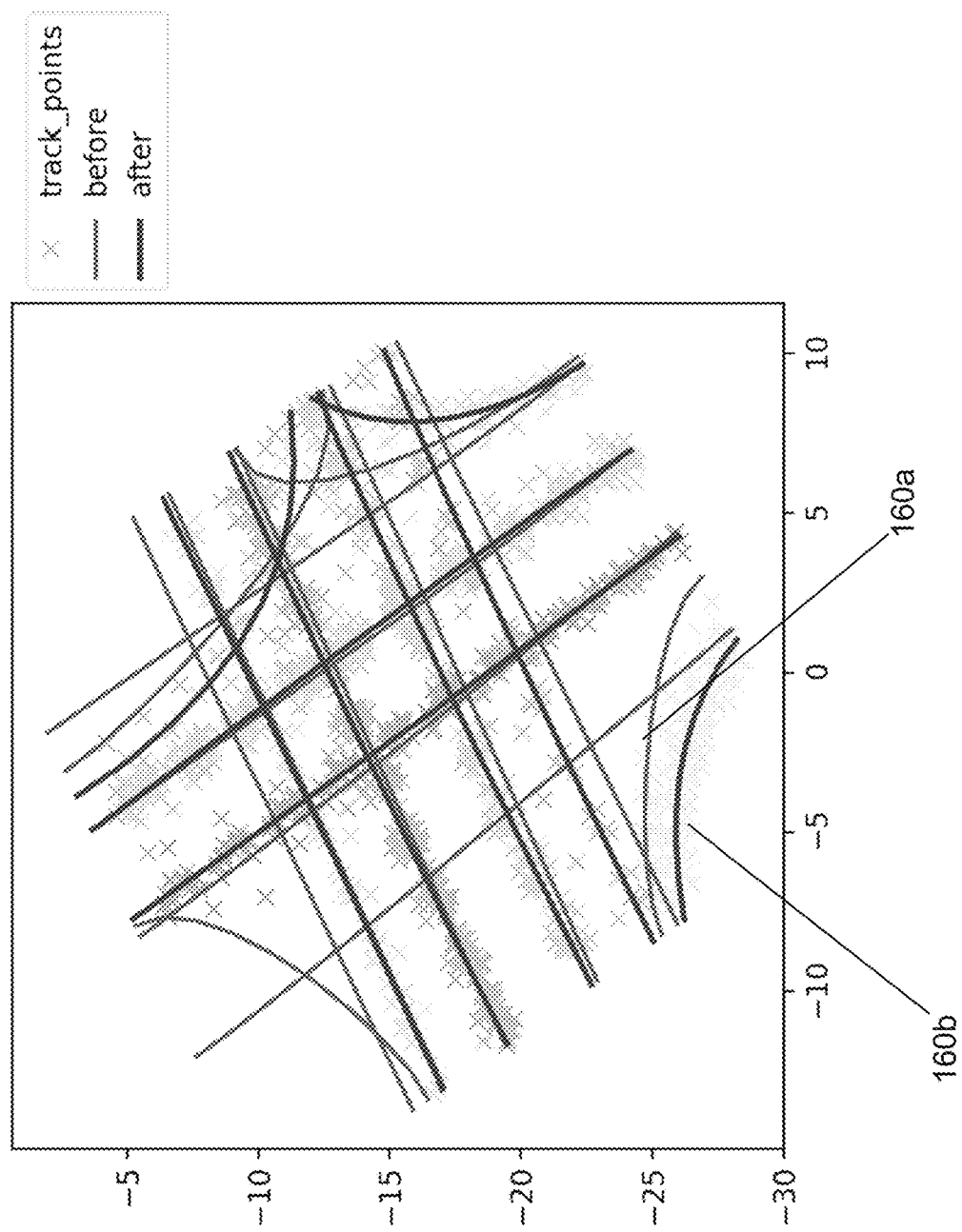
FIGS. 11 to 14 illustrate vehicle tracks before and after refinement using an automatic configuration process.
Figure 12:
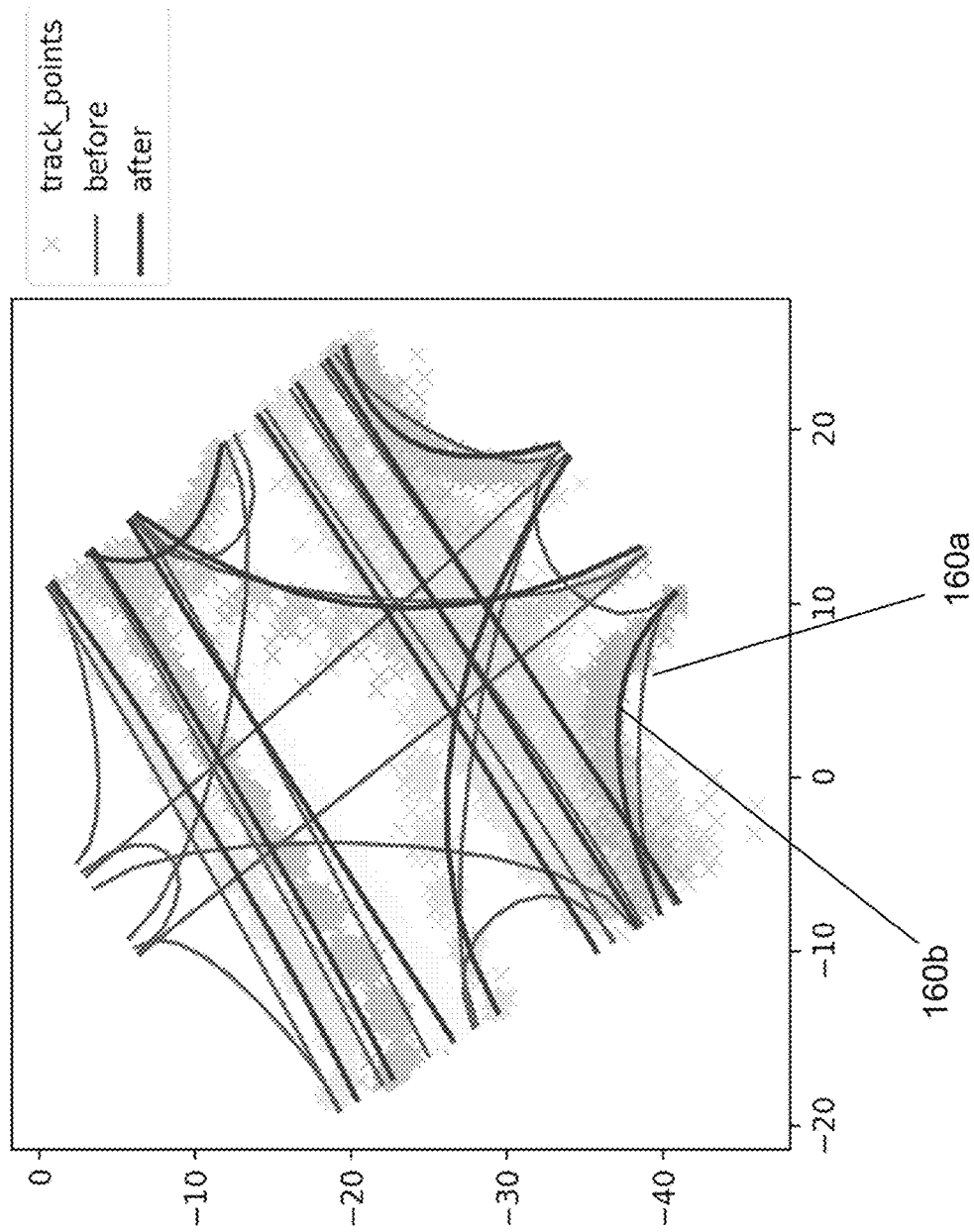
Figure 14:
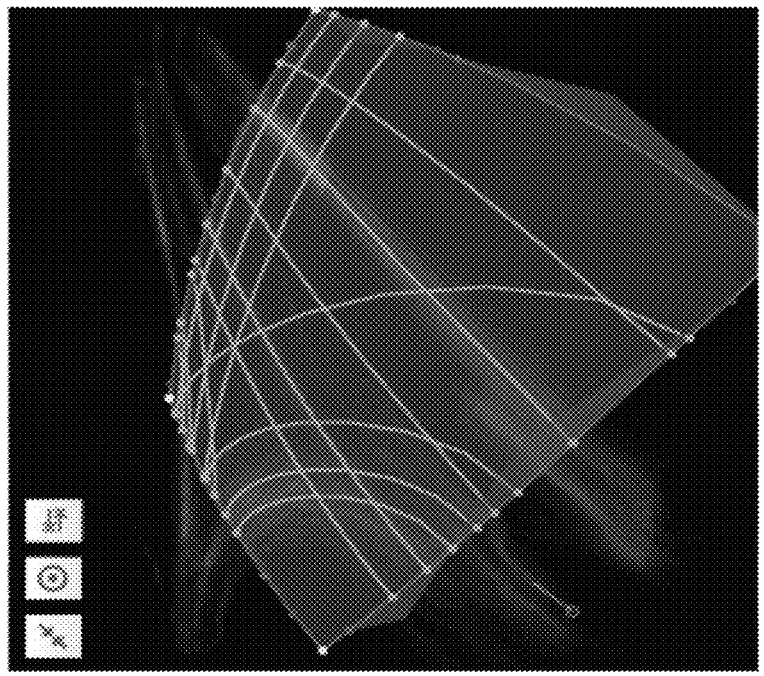
Figure 13:

FIGS. 11 and 12 illustrate track points and configuration tracks before and after the refinement process. Before, in red (example identified by numeral 106a), are set up manually by the user by having them look at the intersection and make their best guess. The after, in blue (example corresponding track identified by numeral 106b), show how the initial red movements deviate to best fit the data obtained from the intersection. FIG. 13 illustrates a camera view before and FIG. 14 the camera view after the configuration has been refined. FIG. 14 illustrates how well the reconfigured approaches match some of the underlying data for vehicles. Compared to FIG. 13, FIG. 14 matches a heatmap representation of the image much better than the initial configuration in FIG. 13. All of the "after" configurations in these figures were generated by refining the initial ones provided by the user. The result is that the user can create an initial one (if desired) and have the computer refine it based on data using the same mappings (thru, left, right, northbound) that the user initially defined.

Figure 15:
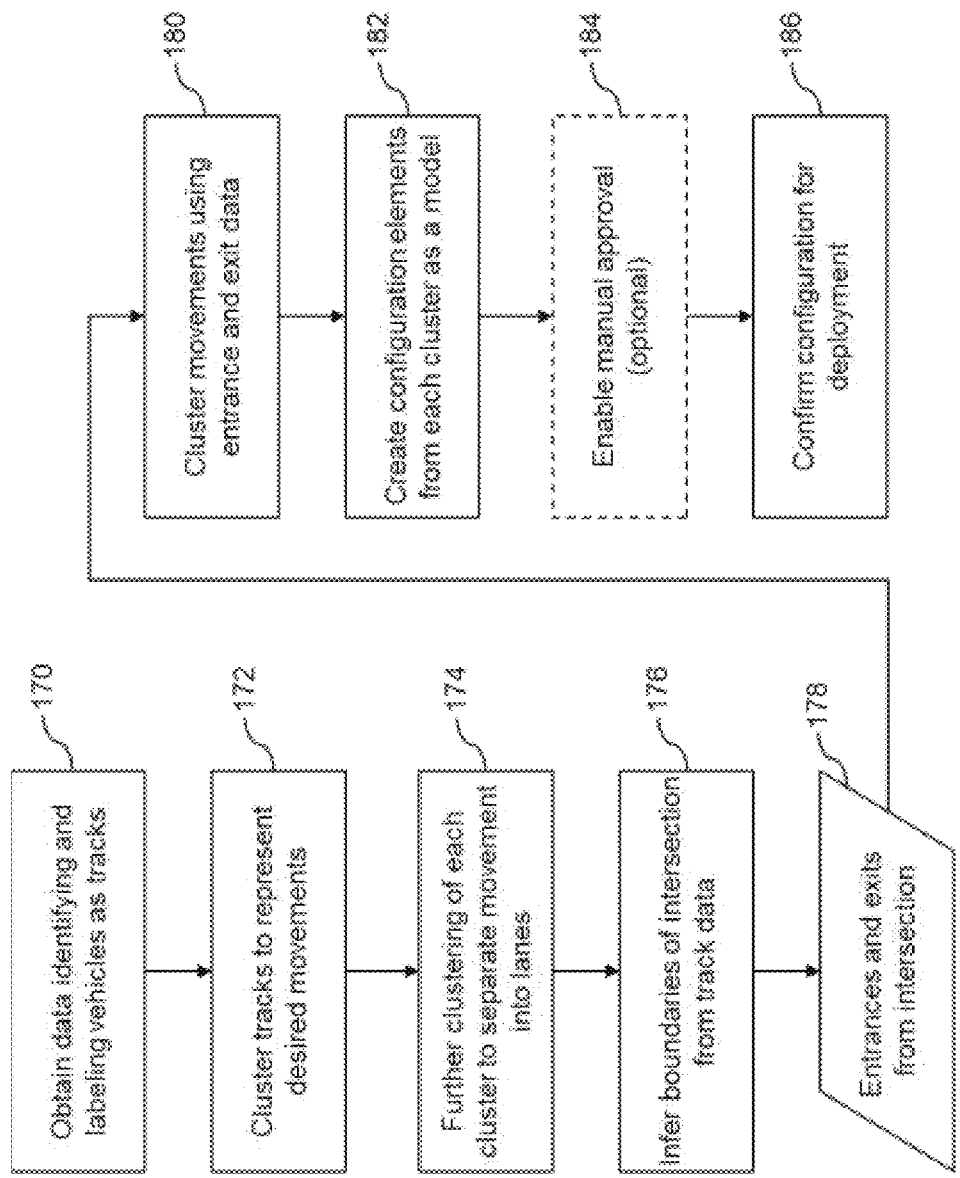
FIG. 15 is a flow chart illustrating computer executable operations performed in automatically generating a new video configuration.

Further detail for an example of an automatic configuration creation process as implemented at 126 (see FIG. 9), is shown in FIG. 15. At 170 data that has been received from the device(s) 14 deployed without a configuration is obtained, which data detects and tracks all vehicles and labels each vehicle with a classification. The tracks are clustered at 172 such that each cluster represents a desired movement (e.g., left turn, S-to-N-bound through movements, etc.). For each cluster, further clustering can be applied at 174 to separate a movement into individual lanes, if desired. For example, a through movement may have three lanes. The boundaries of an intersection and roadway are then inferred from the track data at 176, which generates a set of entrances and exits from the intersection 178. Further detail concerning inferring boundaries is provided below.

The clustering process can occur again at 180, if needed, using the information about entrance and exit locations 178 to improve groupings. The configuration elements can be created from each cluster as a model at 180. For example, the configuration element can be a spline model, which has been proven to be effective. The configuration element can also be a more complicated model such as a probability field, a density model, or a multi-modal composite of any of the above. Existing optimization methods, such as spline fitting, can be used to fit the track data to the spline, or other model. For insufficient data, this configuration element creation operation 182 can create a new element, but also tag that element as having little data so that a user can later determine if they want to map it to something downstream.

Optionally, at 184, the user can be provided with an option to perform a manual approval of the proposed changes from the automated steps described above. The created configuration can then be confirmed for deployment at 186 to be deployed onto the devices 14 as discussed above in connection with FIG. 9.

Figure 16:
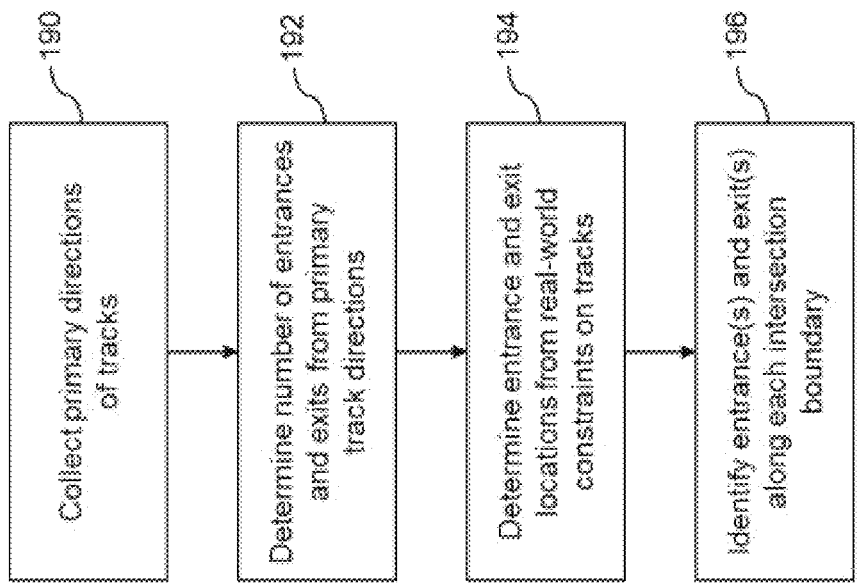
FIG. 16 is a flow chart illustrating computer executable operations performed in inferring boundaries of an intersection from track data in the process shown in FIG. 15.

Further detail for operation 176 in which boundaries of an intersection are inferred from the track data is illustrated by way of example in FIG. 16. At 190 the primary directions of the tracks are collected, for example Northbound, Southbound, North-Eastbound, etc. The number of entrances and exits are then determined by the primary track directions at 192. The entrance and exit locations can be determined at 194 by real-world constraints on the tracks. For example, "forks" are entrances that have two or more paths starting at that direction and ending in at least two different directions. Merges are exits that have two or more paths ending in the same direction but starting in at least two different directions. If no turns are present in an intersection, entrances and exits can be determined by where the vehicle tracks cross and locations where vehicles idle (for instance at stop bars). Heuristics can also be applied, such as those considering that entrances and exits on the same leg are often collinear, but not always as in the case of a slip lane. Common intersection templates can also be used for regularization. The intersection boundary will include all the entrances and exits along the boundary. At 196 the entrance(s) and exit(s) along each intersection boundary are identified for movement clustering at 180 as shown in FIG. 15.

Figure 17:
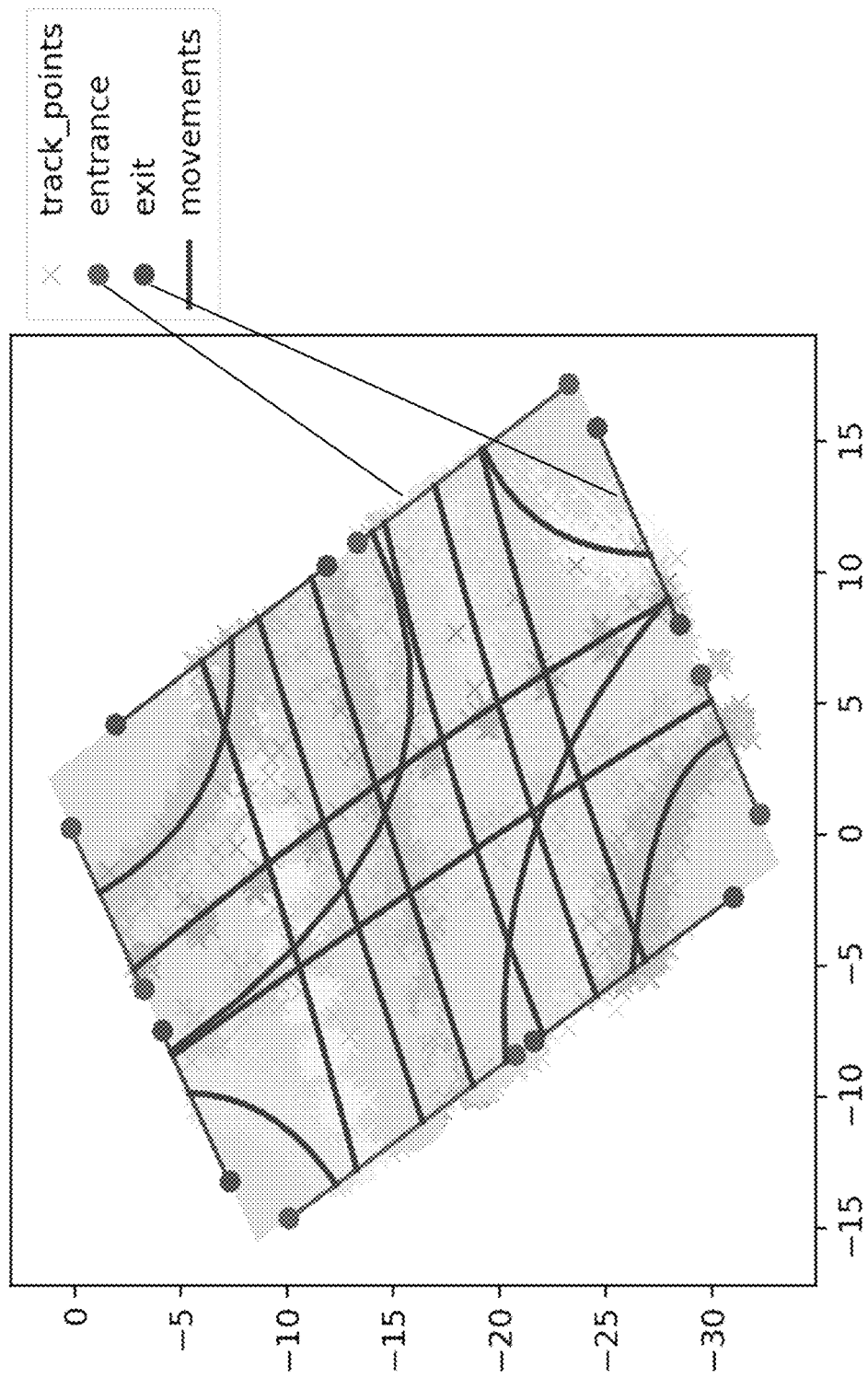
FIGS. 17 to 20 illustrate vehicle tracks, intersection entrances and intersection exits identified using an automatic configuration process implemented for a new configuration.
Figure 18:
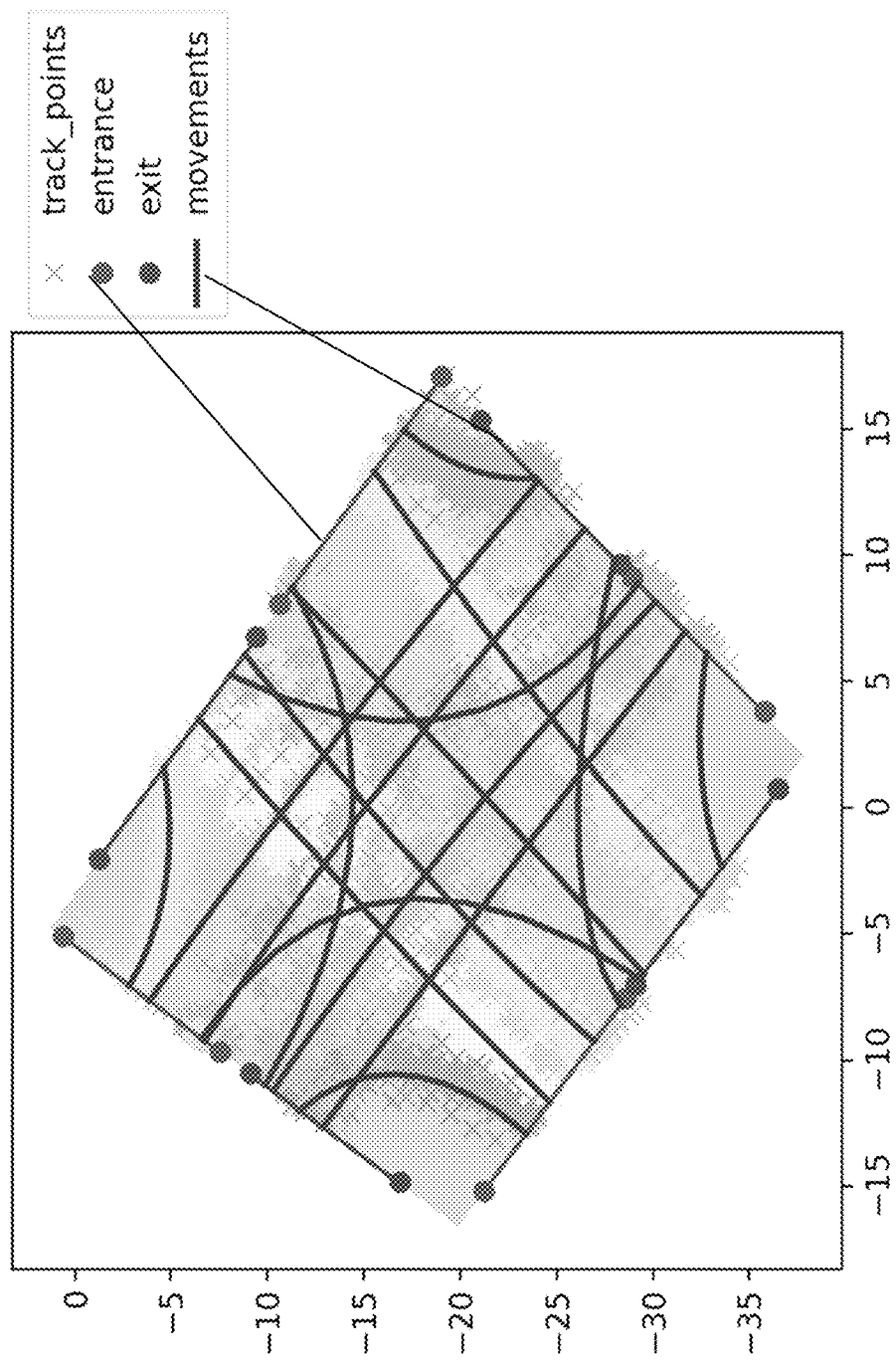
Figure 20:
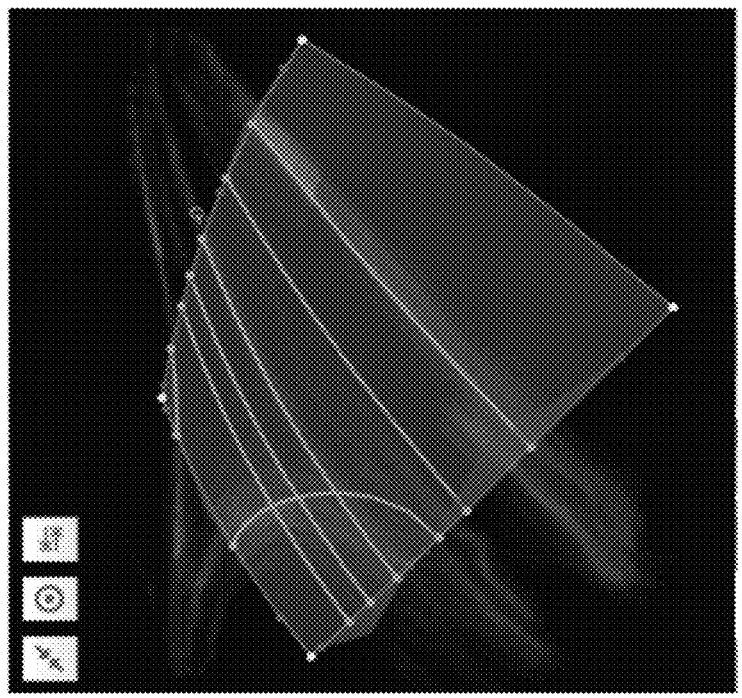
Figure 19:

FIGS. 17 and 18 illustrate track points, entrances, exits, and movements for two different configurations that have been created using the process detailed above. FIG. 19 illustrates a manual configuration and FIG. 20 a fully automated configuration using the fully automated process described above. Unlike FIGS. 11 and 12, FIGS. 17 and 18 did not require any user input at all. With this process, tracks can be generated without initial user input and the configurations can be completely and fully automated without requiring any user input. It may be noted that multiple lanes in the same direction are also discovered and annotated without user input. FIG. 13 is reproduced as FIG. 19, alongside FIG. 20. Unlike FIG. 14, FIG. 20 is entirely automated from scratch based on the data available. One thing to note is that when generating the configuration for FIG. 20, there were no bikes during this sample so a bike-only lane was not generated in this case, as it appears in FIG. 19. Once the data is available, however, the bike lane would appear. Whereas FIG. 14 kept the initial and manual bike lane in place, there was no evidence to support having it in FIG. 20 thus it was not automatically generated. This illustrates an advantage of refining a manual configuration rather than creating one entirely from scratch. There are, however, cases where the manual configuration does not have a corresponding movement, but the fully automated one does. Ultimately with enough data, the fully automated process should capture all of the movements.

Semi-Automatic Configuration

As shown in FIG. 5, the configuration user interface 44 can also access a semi-automatic configuration process 61, which can be used such that the automated configuration output is used in a semi-automated user interface. The challenge with existing configurations is that the user is commonly asked to configure a scene for video processing before the video runs. As established, this is typically error prone if the user misses vehicle movements or does not configure where the vehicles or people actually move. In other cases, the user may not want certain movements counted, but may not know without looking at the video, which can be very time consuming.

The semi-automated configuration described herein improves configuration accuracy and allows the user to label movements after the video processing runs. Referring to the flowchart in FIG. 21, first, a live or recorded video obtained at step 200 is processed through an automated computer vision (CV) algorithm at step 202, which detects, generates, and produces high quality tracks at step 204. In step 204 the algorithm can also estimate the camera position allowing the tracks to be registered to a scaled model, for example in meters, of the world.

Figure 21:
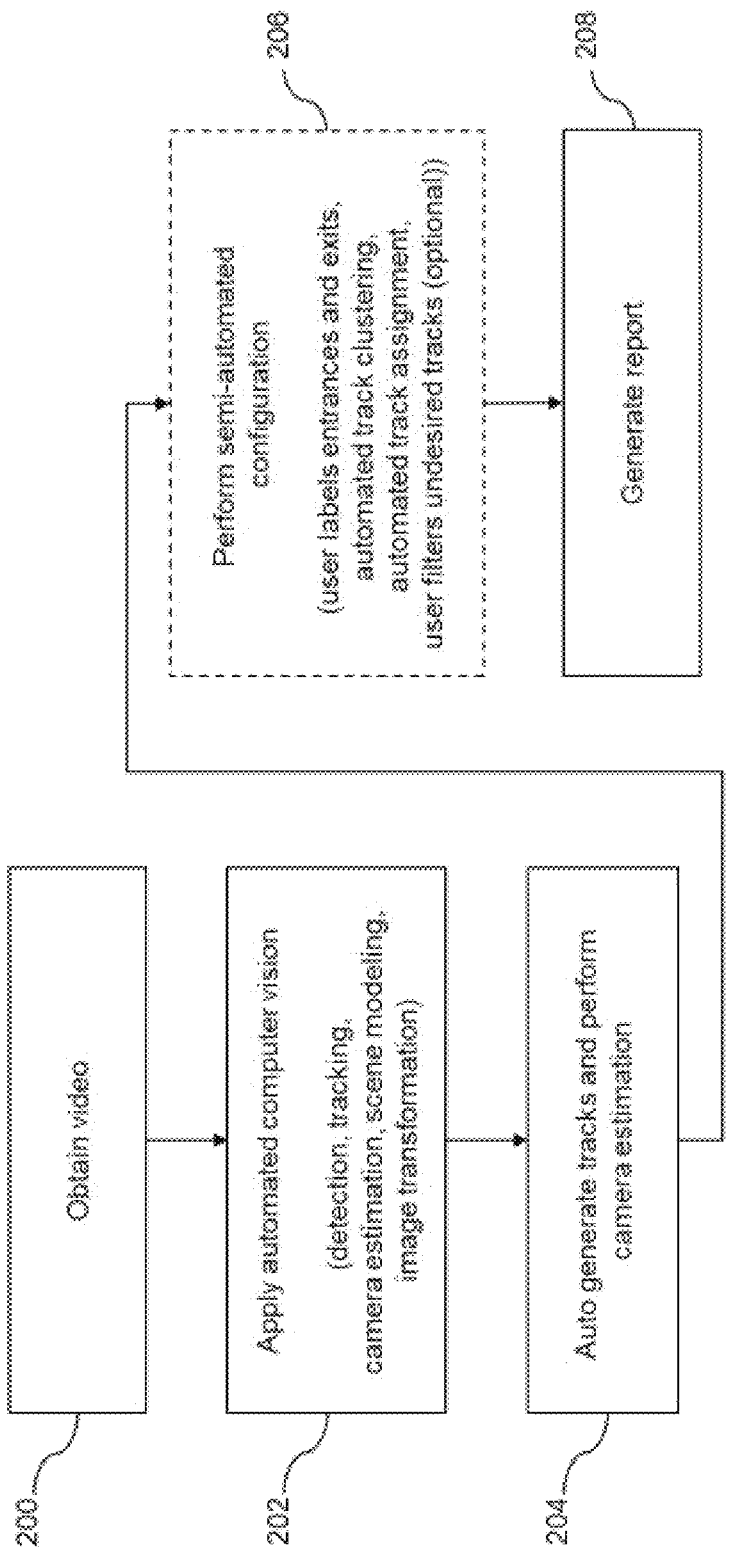
FIG. 21 is a flow chart illustrating computer executable operations performed in applying a semi-automated configuration process.

Next, at step 206, when optionally using the semi-automated interface, the user is presented with the track data, and optional camera estimate, and is then able to label the data. Rather than requiring a tedious process requiring the user to draw precise movement templates, the user simply labels the approaches and the automated part of the user interface does the rest. In FIG. 21 this can include automated track clustering, automated track assignment, and this also enables the user to filter undesired tracks as an optional step. A report or other output of the semi-automated output can then be produced at step 208.

The automated part of the user interface can take the user-drawn zones and associate tracks that either enter or leave those zones. As the user draws additional zones, the automation can immediately update the display so that the user can quickly see tracks that originate from one zone and terminate in another. This provides real-time feedback and interactivity to the user so that they can quickly and effortlessly iterate on their zone placement without any doubts as to what is being counted and what is being excluded. Previously, such a process involved guesswork and the user would typically wait some time for video completion before getting feedback. By processing first without user input, the time from video collection to preparing tracks for user labelling is significantly improved and fully automated.

Once the user completes all desired approaches, the automated configuration publishes the generated movement templates. These templates can be created by clustering all tracks that originate from and terminate in the same pairs of zones using any standard clustering algorithm.

Additional post-processing can also occur automatically. With the templates created, the automated part of the user interface can quickly remove outliers, update the estimate of the camera orientation and position, provide different clustering based on object type, and identify potential tracks that are not matched to the template, in the case the user missed them accidentally.

Rather than drawing zones for the approach entrances and exits, the user could swap them out with line segments. Anything that crosses the line segment could be considered as entering or exiting, more generally passing through, they are of interest. Templates can be readily constructed using the same procedure as the zones.

The semi-automated configuration can also provide very accurate track to real-world correspondence by asking the user to provide a scale, either through geo registration or by clicking on two image coordinates and specifying a real-world distance. The same procedure above applies, but now also takes into account a more accurate camera position applied on top of the automated estimate.

Figure 22:
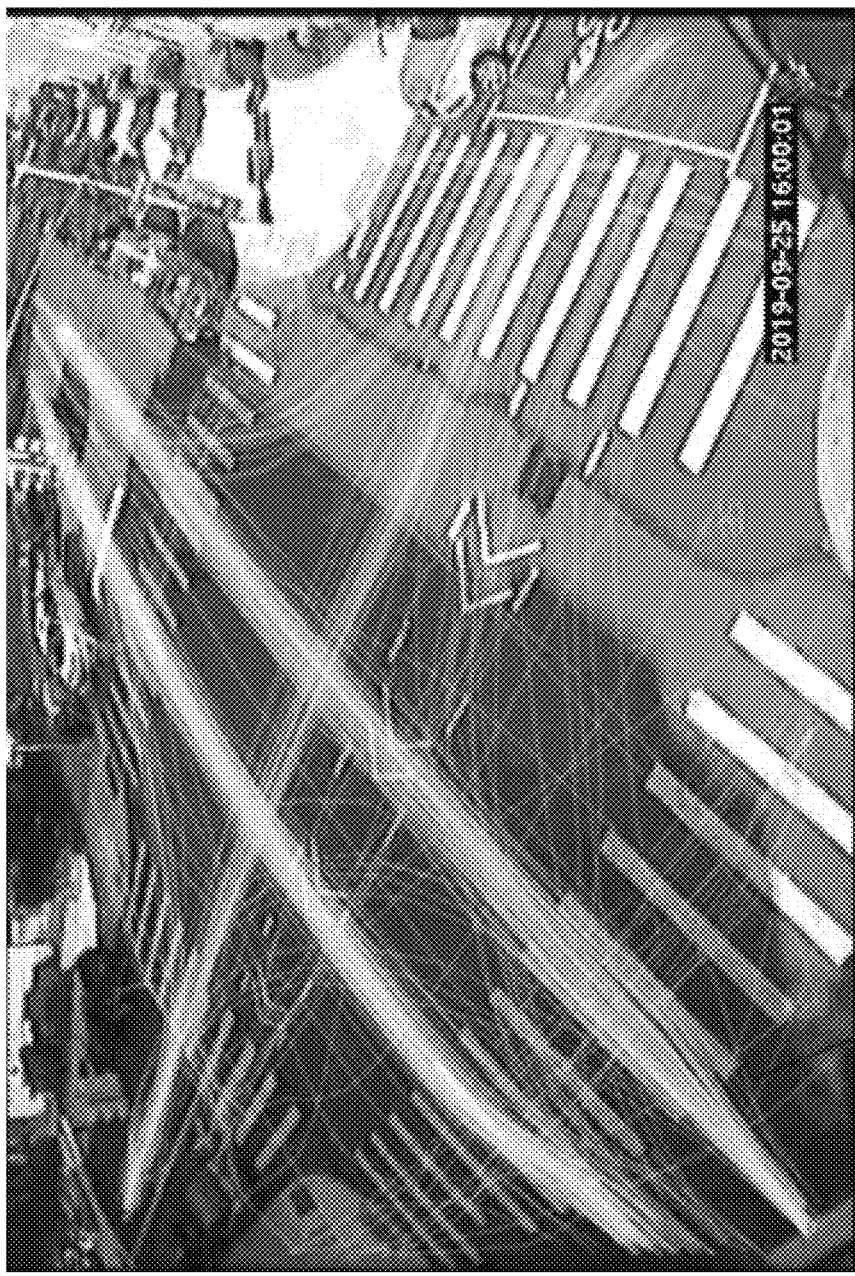
FIG. 22 is an image showing automatically generated tracks in a video.
Figure 23:
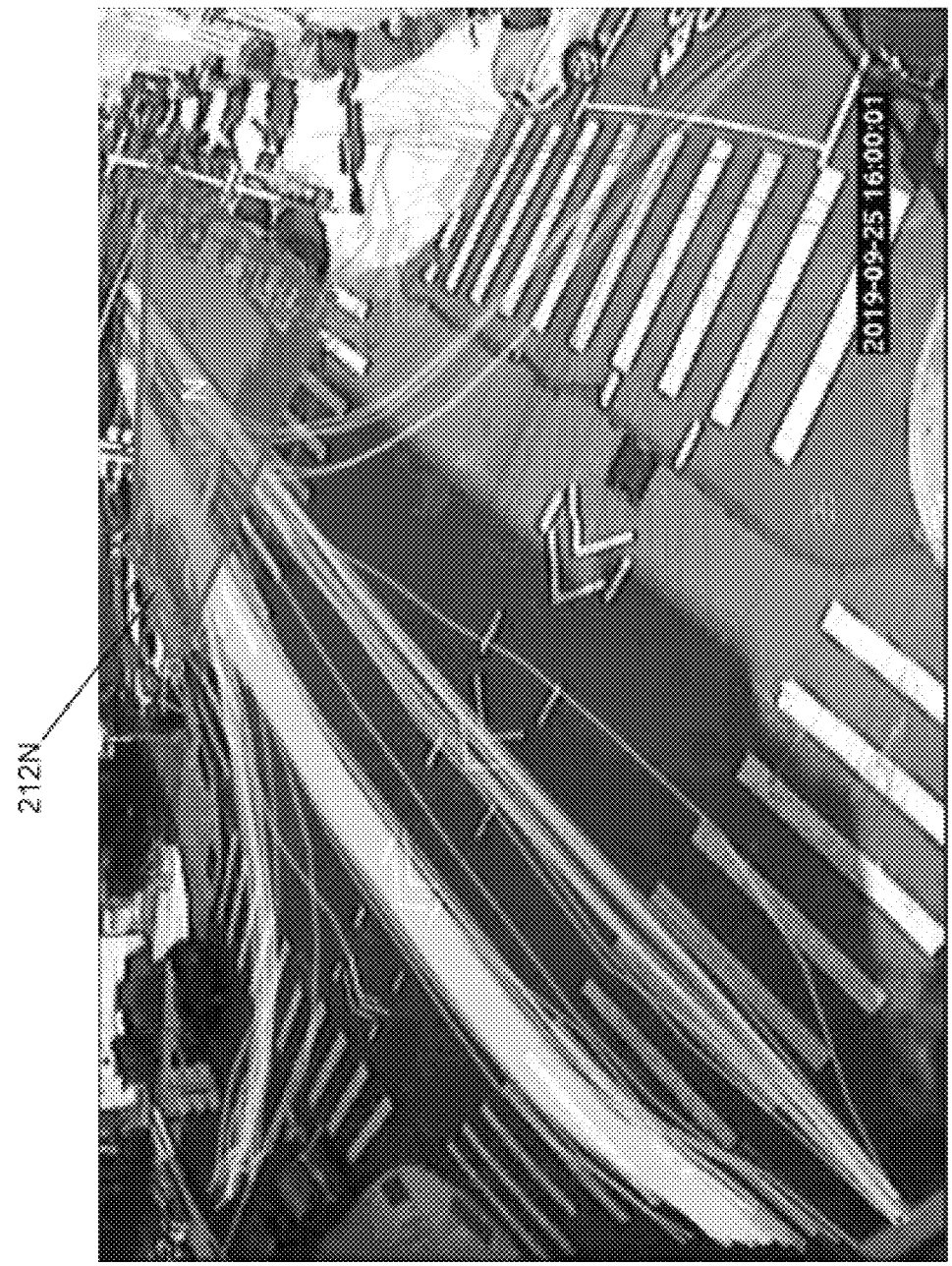
FIG. 23 illustrates the image of FIG. 22 with a first user-labeled approach that is automatically associated with one or more tracks.
Figure 24:
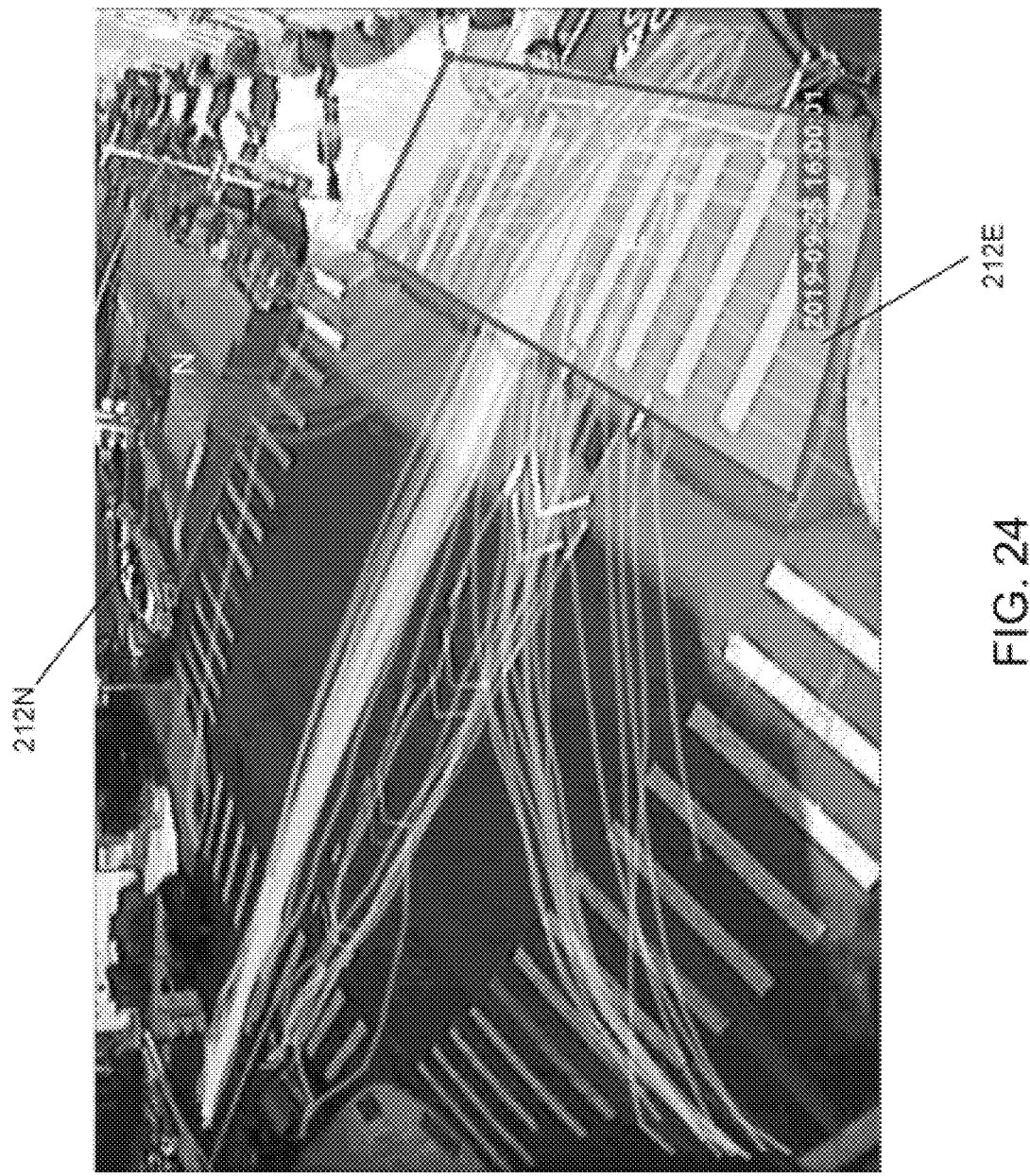
FIG. 24 illustrates the image of FIG. 22 with a second user-labeled approach enabling automatically clustered and labelled tracks.

This process is further illustrated making reference to FIGS. 22 to 26. Referring now to FIG. 22, the automated CV system can convert the video into tracks 210, and creates an approximate camera configuration so that the tracks are mapped in a common and scaled coordinate system (e.g. meters). These tracks are presented to the user when the video completes, or streamed if desired. As illustrated in FIG. 23, the user labels an approach 212N and, tracks are automatically associated. Next, as shown in FIG. 24, the user labels a second approach 212E, and tracks are automatically "clustered" and labelled.

Figure 25:
FIG. 25 illustrates the image of FIG. 22 with a complete set of user-labeled approaches with tracks being shown assigned to movements as the user configures the application.
Figure 26:
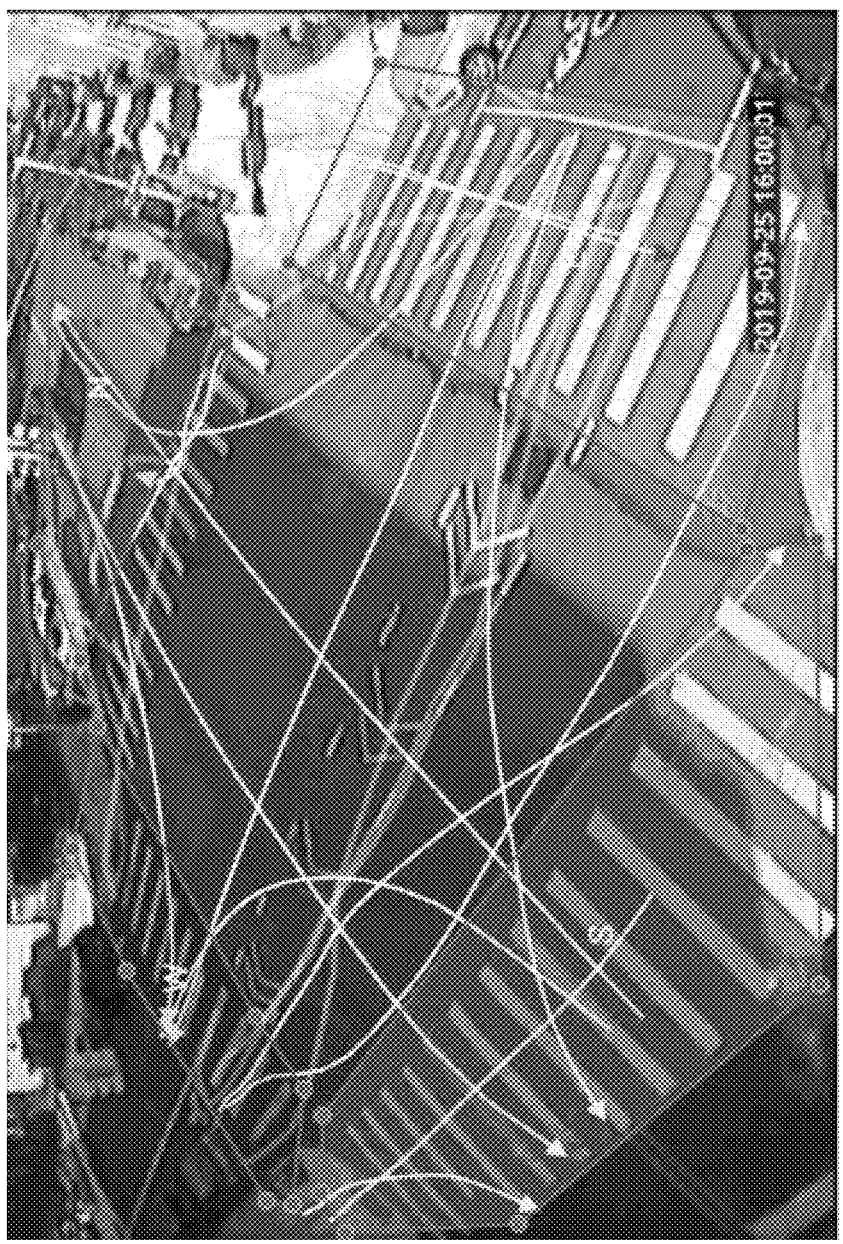
FIG. 26 illustrates the image of FIG. 22 clustering and template creation applied to an intersection with all approaches labelled.

With labelled approaches, the user can easily see which tracks are assigned to which movement in real-time, as they configure the application. The clustering and assignment portions are automated. Once all approaches are labelled as shown in FIG. 25, the automated part of the config completes the clustering and template creation. All tracks are then associated with a movement template as shown in FIG. 26 and reported.

Automatic View Splitting

There are many situations where a single camera has a large field of view and can be split into several views for computer vision algorithm processing. One such example is a hemisphere lens attached to a surveillance camera. The camera, when facing downward, can see the horizon in all directions. A typical computer vision processing algorithm may accept views that are 300×300 pixels for efficient processing in real-time; they generally are not efficient on 4k images directly and scaling the 4k down to the 300×300 would result in significant object resolution loss. A typical, existing methodology is to split the large image into sub-views, and often will convert the warped looking image from the camera into a perspective projection, which is more characteristic of a "normal" camera.

For a manual configuration, after the user specifies what computer vision data they want to map downstream, they would need to then figure out how to split the fisheye view into sub-views that work best for the underlying computer vision algorithm. The user would be required to determine the minimum, average, and maximum pixels per meter of each vehicle class as it would move through the predefined configuration elements. For example, a bicycle moving along a right turn may have 30 pixels/m at the start and 100 pixels/m in the middle of the movement. Then, the user would need to assign each of these configuration elements to a view that provides sufficient resolution for that class, not too much and not too little, based on empirical results for a computer vision algorithm. Following the above example, the best bicycle accuracy may be at 50 pixels/m. This problem can be intractable for a typical user with little to no understanding of computer vision.

The automatic camera view splitting process 64 (see FIG. 5) formulates and implements an optimization method that can find a feasible solution that best maximizes a fit score for each configuration element and each view movement.

Figure 27:
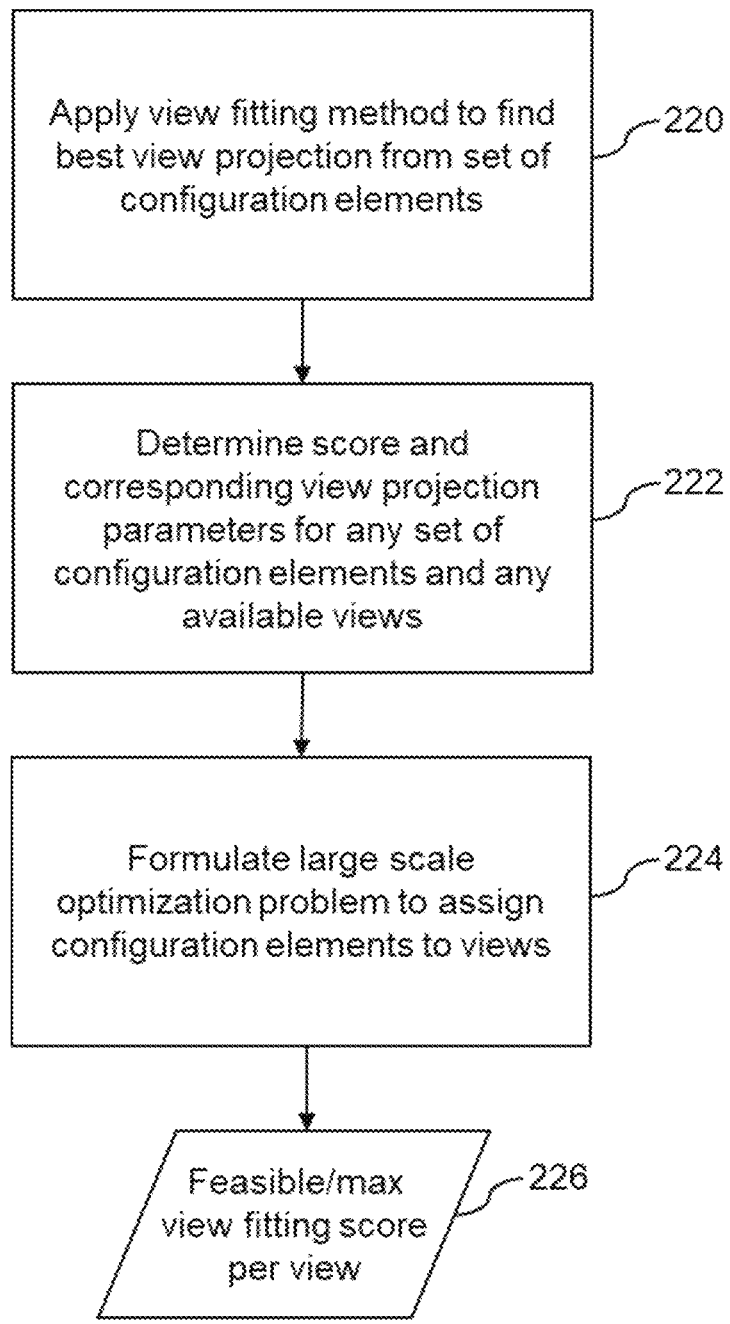
FIG. 27 is a flow chart illustrating computer executable operations performed in an automatic camera view splitting process.

Referring to FIG. 27, at 220 a view fitting method can be applied to find the best view projection from a set of configuration elements. Traditional "fit objects to view" methods find the convex hull of all the object extremity points in a view and then solve the inverse problem of finding view parameters (such as zoom, center-point, and rotation), that maximize the area of the projected convex hull in the view image space. There are many such implementations that previously exist. Using a traditional "fit objects to view" method applied to a set of configuration elements, a score can be generated from a set of criteria and constraints. From a detailed study of a computer vision detection algorithm, the optimal resolution of an object class can be determined, as well as the resolution limits where accuracy no longer becomes acceptable. These resolution limits can be stored in a lookup table and can be used to establish criteria. A more powerful "fit objects to view" method can be implemented using existing mixed-integer program (MIP) optimization methodologies. The resolution constraints per class can be converted into criteria using cost-injection variables that severely penalize invalid constraints, but also provide a gradient for the solver to follow from an infeasible starting solution into a feasible region.

Statistics for each configuration element, regarding resolution, can be calculated and used to measure the distance from the ideal pixels/m resolution for sampled points near the configuration elements. This resolution difference can be aggregated for each class using the worst score across the class types along the path and be added into the optimization cost function. Furthermore, the cost function can include other desirable properties, such as how long of a path is required for a sufficient match; rather than requiring the entire convex hull to be visible, one can exclude parts that add little information context in favor of increasing resolution/m. The resulting cost function can include the resolution and behavior terms that correlate with a good view. The view projection parameters (e.g., center, zoom, and rotation) are the parameters for which the MIP attempts to find while optimizing the cost function. Experiments have shown that a simple and existing solver, like Gradient Descent, is able to find the camera projection parameters that achieve the best computer vision accuracy through the optimization formulation above.

Since the configuration has a large number of requirements, it may not be possible to fulfill them all. A development here is the discovery of a system where fulfilling all of the requirements is not necessary. By focusing on the desired behavioral aspects above, like resolution/m, grouping adjacent lanes, and targeting sufficiently long and short pieces of a movement rather than the whole movement (like the bend in a turn), the entire movement, which may require more resolution than is available for real-time performance, is not needed. Instead, these desired behaviors are encoded into the fitting algorithm, each with a minimum, ideal, and maximum tolerances from an ideal. Though this formulation may be simple in some cases, and existing solver methods can be applied, here are the ideal characters for a given class, do not exceed these deviations or impose a large penalty with a gradient pointing the solver towards the ideal. For the traffic industry problem, some of the features included (i) min/idea/max resolution per meter for each class, (ii) a minimum/ideal/maximum path length for each class based on their size and speed, (iii) preferences to select from one or more cameras based on camera proximity to path and potential occlusions due to lane obstructions, (iv) preferences to capture the movement where unique features, like bends or turns occur, (v) fitting as many points as possible from a zone, (vi) balancing trade-offs to produce a sensible configuration even when a feasible solution cannot be found, the best infeasible solution for the user. An example of a trade-off would be preferring to create reliable detection zones in favor of countable movement paths because the detection zones have real-world actuation consequences Using the view fitting function above, a score and corresponding view projection parameters can be determined at 222, for any set of configuration elements and any number of available views. For example, one may wish to find the least number of views to obtain feasible view projection parameters. Or, one may wish to find the most accurate setup given a fixed number of views, as determined by hardware or environment constraints.

At 224, a large scale optimization problem can then be formulated to assign configuration elements to views, which achieves a feasible/maximum view fitting score 226 for each view. A specific implementation can include a branch and bound algorithm with a modified assignment problem formulation method:

No empty views allowed.

Can move configuration element to a different view.

On each iteration, start with the configuration element with the worst score. Attempt to move it to other views and select the view that results in the best overall score after the move. If no movement occurred, try moving the configuration element with the second worst score and so on. Continue until maximum iterations have been executed or combinations have been exhausted. The result is always at least as good as the current iteration.

Branch and bound because the worst case elements are on the optimization boundaries and are the ones being reassigned. When a worse assignment is discovered, there is no further effort in that direction.

While in theory, it is possible to get stuck in a local minimum, in practice and testing, the system did not fail to converge to the best solution.

Figure 29:
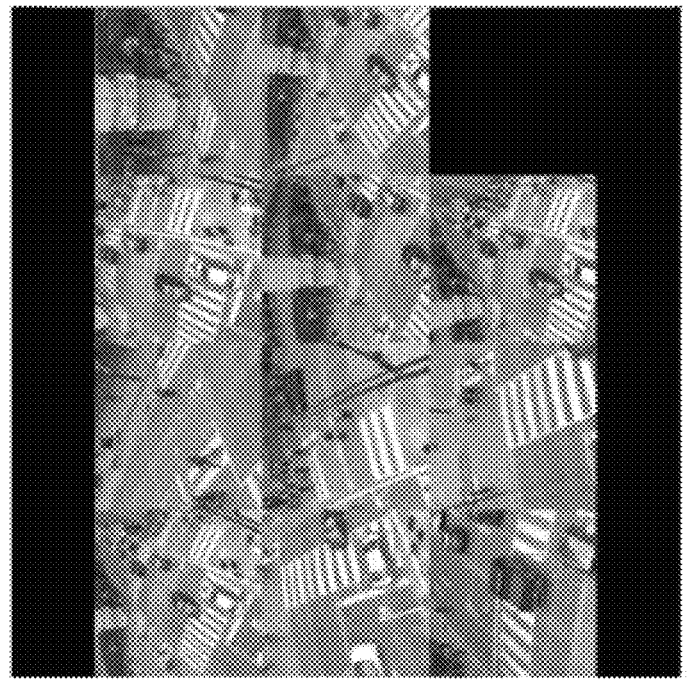
FIGS. 28 and 29 illustrate a manually configured five-view configuration assigned to in a nine-view configuration.
Figure 28:
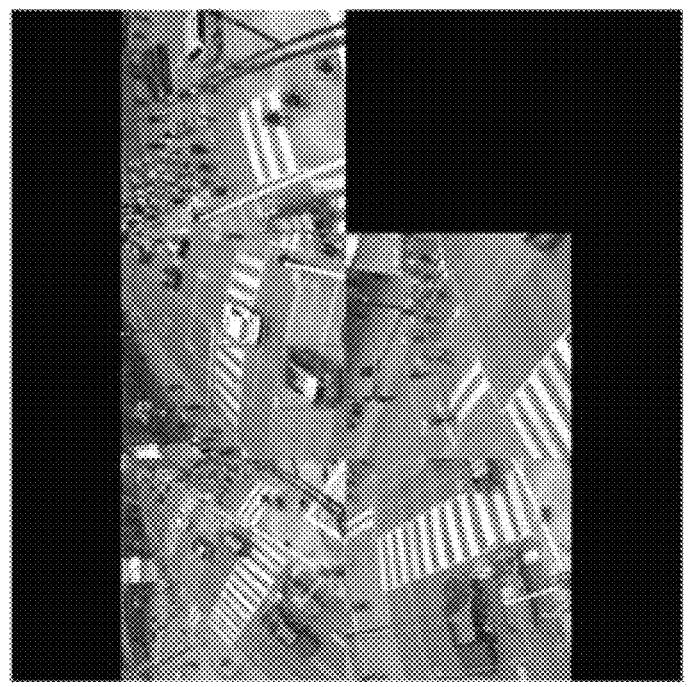

FIGS. 28 and 29 illustrate a manually configured five-view configuration to be automatically assigned in a nine-view configuration. The manual setup was not optimal and insufficient to achieve accuracy targets. The automatic view splitting was able to find configuration assignments for all nine-views and by changing the view projection parameters of all nine-views to hit the accuracy targets. The configuration in FIG. 28 has severe problems in that small objects like pedestrians and bikes do not have enough resolution as configured to be detected by the computer vision object neural network model. By combining statistics from available model analytics and applying an automated configuration refinement step, the system was able to create the configuration in FIG. 29, which ensures that each movement and detection zone has sufficient resolution and has captured enough of the region of interest such that the computer vision algorithm will accurately detect the objects in the scene.

Automatic Camera Assignment

There are situations where multiple cameras are used to capture data for the same scene. While they can be overlapping, they do not necessarily need to be. For example, a large intersection may require two cameras to resolve occlusion issues or to have sufficient optical resolution for the computer vision algorithm. Other scenes may have complicated geometry or camera mounting challenges that require different cameras to watch different entrances or exits.

Figures 30, 31:
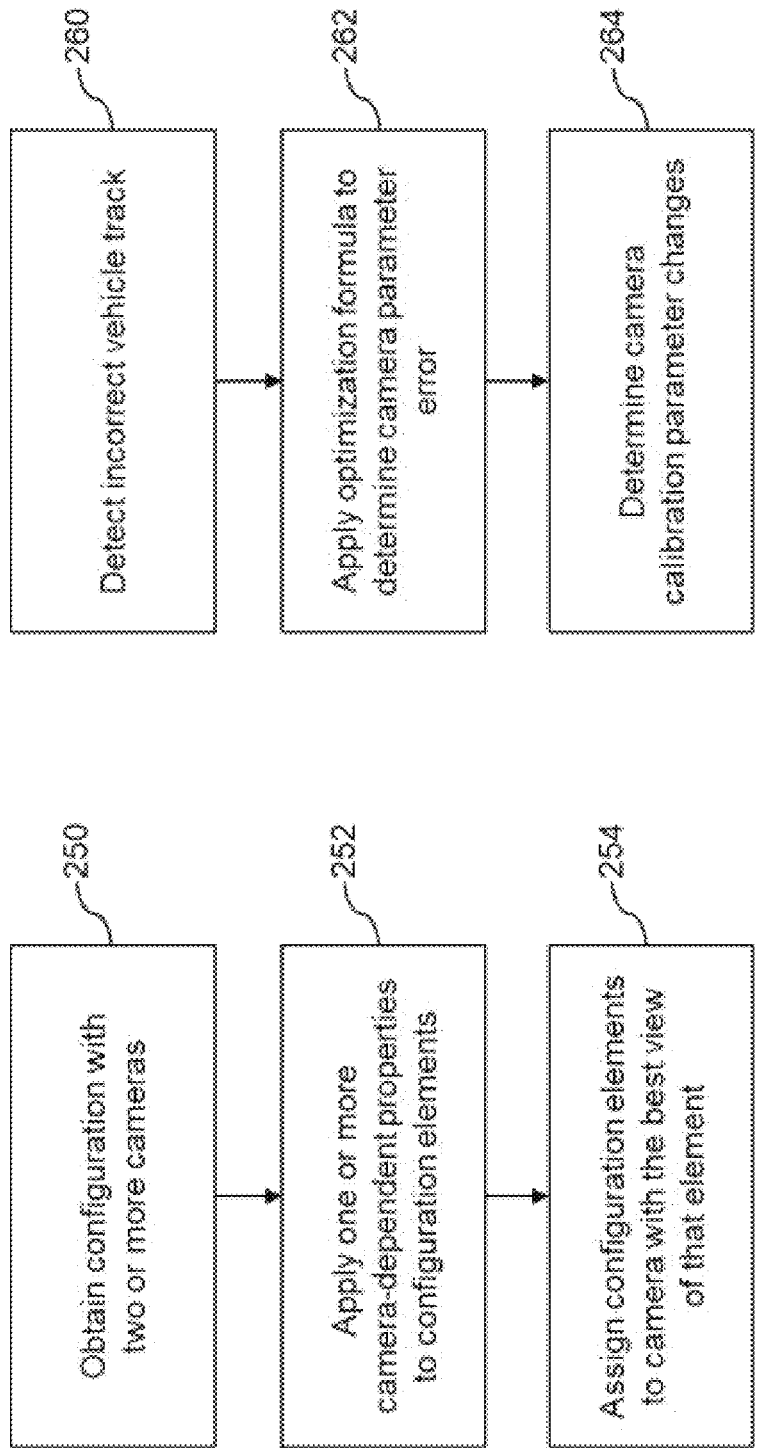
FIG. 30 is a flow chart illustrating computer executable operations performed in an automatic camera assignment process.
FIG. 31 is a flow chart illustrating computer executable operations performed in a camera calibration process.

It has been found that assigning a movement to the best camera is another configuration challenge, which can also be fully automated. Referring to FIG. 30, given a configuration with two or more cameras at 250, the configuration elements can be assigned to one camera with the "best view" of the configuration element at 254 by applying one or more camera-dependent properties to the configuration elements at 252. For example, the camera for which the ground point is closest to the ground points of the configuration elements can be selected as the best camera. The camera that maximizes the resolution for configuration elements can also be selected as the best camera. The camera that has the least occluding other movements between it and a desired configuration element can also be considered the best camera.

The camera resolution and occlusion parameters can be encoded into a cost function and can extend the automatic view splitting algorithm. Rather than the algorithm operating on all views from the same camera, the algorithm can include camera assignments to each view; in addition to view projection parameters (center, zoom, rotation) an additional "which camera" parameter can be included. The optimization method can then move a view between each of the camera view sets and recalculate the score. Using a branch and bound optimization method the extended automatic view splitting algorithm can now include better resolution options as well as occlusion.

It can be appreciated that other camera dependent properties can be included as well, such as, but not limited to, preference to view vehicles from the side rather than the front due to additional visual features.

Camera Calibration

In addition to the spatial locations of the configuration elements, the camera calibration can also be automated, again either fully or in an assistant capacity, based on data from the scene. The video contains a lot of information and by creating a mathematical model the behavior of vehicles in the scene can impose self-consistency constraints on the camera making it possible to tune camera calibration parameters. There are many existing methods that do these in various capacities that can be incorporated as part of the system to simultaneously improve the camera position and also improve the spatial locations of the configuration elements.

As vehicles move through the scene, it is possible to automatically estimate and adjust the camera height and lens parameters. The vehicle physical properties do not change through the camera parameters and can be adjusted to minimize changes to the vehicle length, width, and height, for every single vehicle that moves through the scene. This can be implemented using an online solution as well so that each vehicle provides a tiny amount of correction to the system. In addition, the vehicle track properties are also useful to correct camera parameters. For instance, the nadir and height of the camera, when incorrectly set, will result in a thru-movement becoming curved due to mismatches in the view projection and the vehicle ground paths. Using pattern recognition to determine if the movement is straight or turned, the straight movements can be clustered and used in an optimization formulation that controls the camera parameters to straighten out the ground points. This is particularly useful for highways where the road segment is largely straight. This is less useful for scenes of curved roadways or at atypical intersections. If this algorithm is enabled, it will help improve the camera calibration using data from vehicle tracks.

Other existing computer vision algorithms can also be included here. This includes items like finding the orientation of the horizon and adjusting the camera to match or finding buildings and straight lines in the scene to help ensure consistency.

Referring to FIG. 31, a camera calibration process 68 can include detecting an incorrect vehicle track at 260, applying an optimization formula to determine a camera parameter error at 262, and determining any camera calibration parameter changes at 264.

Augmenting Configurations with Additional Data

Orientation maps are useful for computer vision algorithms to have an initial guess of where vehicles come from. These can be added to the configuration, and do not require users to label directions. While less challenging for a user to label, orientation maps provide a way to ensure that the positions where vehicles enter are consistent with the data, e.g., an inbound configuration element also has data that show vehicles entering the video in those zones. The use of object detection and tracking can provide orientation as well as other existing computer vision solutions like optical flow.

Figure 32:
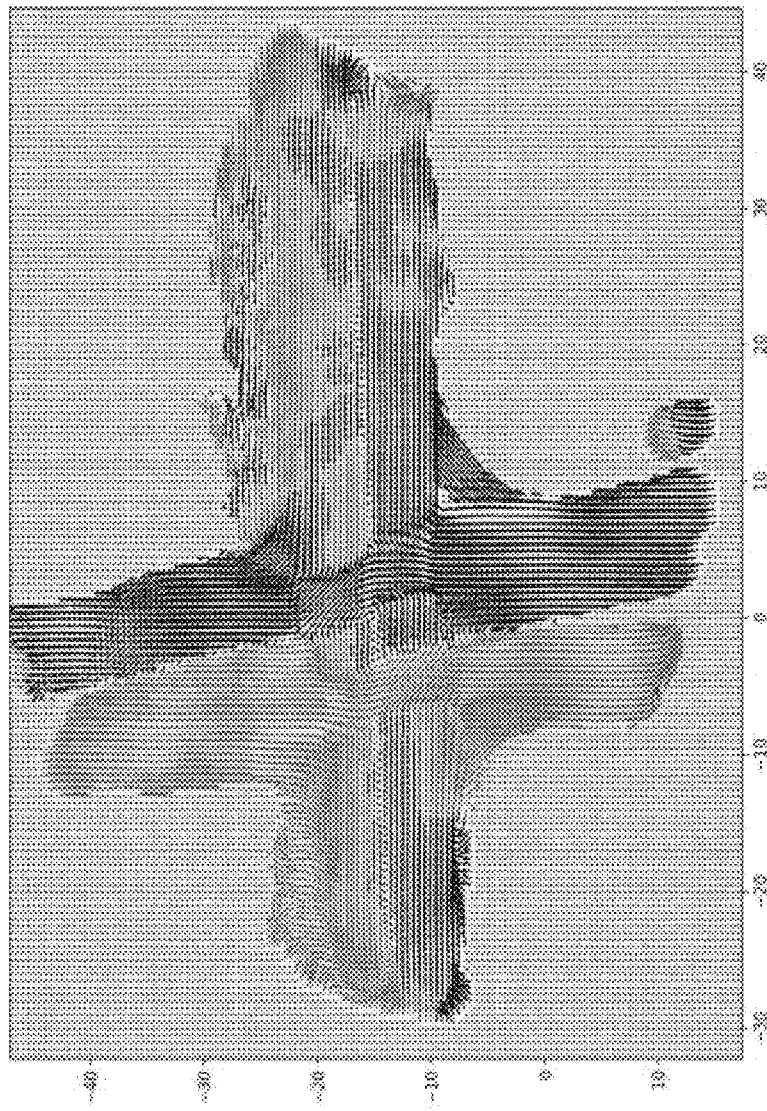
FIG. 32 illustrates an example of an orientation map.

FIG. 32 illustrates a possible orientation map, where the vehicle direction can be visualized with small directional arrows. The entrance and exit are further emphasized through coloring of red and black, while the underlying data is simply a directional angle at each position. While this happens to be a pixel based orientation map, the data structure can be any existing type, like a polygon with a direction of travel assigned to it. The main purpose is to use data like this in addition to the above to further assist the user in configuring an intersection.

Modular Lane Finding Algorithms

Existing literature has a number of algorithms that segment the scene to find lanes. These algorithms can also be integrated into this system. The above algorithms were created specifically to solve a domain specific problem. There are other algorithms that can contribute to further refine configurations, camera parameters, and view parameters.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the vehicle capture device 14, ITS 20, configuration platform 22, or machine learning platform 42 any component of or related thereto, or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of refining a configuration used by a video analysis system for analyzing videos, comprising:
    deploying the configuration to at least one video capturing device positioned to capture a video of a scene, the configuration including a spatial arrangement of a first set of one or more elements within the scene, a region of interest including the first set of one or more elements defined within the scene for analyzing the video, and one or more of settings and parameters associated with the video and the video capturing device, wherein the region of interest comprises at least one roadway or traffic intersection;
    receiving video data from the at least one video capturing device, the video data including data associated with one or more of objects detected within the scene;
    assigning a label to each of the one or more objects detected within the scene, the label being indicative of a type of the object;
    determining a movement pattern for each type of object based on the data associated with the one or more objects detected within the scene;
    refining the spatial arrangement of the first set of one or more of the elements within the scene based on the determined movement patterns corresponding to each type of objects;
    identifying one or more areas within the scene indicating changes to the scene over time based on the received data associated with the objects, wherein the identified one or more areas include elements not included in the first set of one or more elements from the region of interest as defined within the deployed configuration;
    refining the region of interest to include a second set of one or more elements that include the elements not included in the first set of one or more elements based on the changes to the scene in the identified one or more areas to generate a refined region of interest;
    adjusting the one or more of the settings and parameters associated with the video and the video capturing device based on the refined spatial arrangement and the refined region of interest to generate a refined configuration for use in analyzing videos; and
    deploying the refined configuration to the at least one video capturing device.

2. The method of claim 1, further comprising iterating the method at least once to further refine the configuration.

3. The method of claim 1, further comprising using the refined configuration in at least one downstream data consumption process.

4. The method of claim 1, wherein the configuration is automatically refined by:
    creating vehicle tracks from the data received from the at least one video capturing device;
    clustering the vehicle tracks to represent desired movements, using at least one feature;
    further clustering the clustered vehicle tracks to separate movements into lanes and generate an initial configuration;
    mapping each cluster to an element in the configuration;
    manipulating the configuration elements to improve the representation of the tracks; and
    confirm the configuration for deployment.

5. The method of claim 4, wherein the at least one feature is predetermined.

6. The method of claim 4, further comprising enabling a manual approval of the manipulated configuration elements.

7. The method of claim 1, further comprising automatically generating the configuration prior to deploying the configuration by:
    deploying at least one video capturing device;
    running at least one computer vision algorithm to detect vehicles and assign labels;
    receiving data from the at least one video capturing device; and
    automatically generating the configuration to be deployed to the at least one video capturing device.

8. The method of claim 7, further comprising iterating the operations of claim 7 at least once to further refine the configuration.

9. The method of claim 8, further comprising using the refined configuration in at least one downstream data consumption process.

10. The method of claim 7, wherein the configuration is automatically generated by:
    obtaining data identifying and labeling vehicles as tracks;
    clustering the tracks to represent desired movements;
    further clustering the clustered tracks to separate movements into lanes;
    inferring boundaries of an intersection in the scene from the track data to determine a set of entrances and exits from the intersection;
    clustering movements using the entrances and exits;
    creating configuration elements from each cluster as a model; and
    confirming the configuration for deployment.

11. The method of claim 10, further comprising enabling a manual approval of the created configuration elements.

12. The method of claim 10, wherein the boundaries are inferred by:
- collecting primary directions of tracks;
- determining a number of entrances and exits from the primary track directions;
- determining entrance and exit locations from real-world constraints on the tracks; and
- identifying the entrances and exits along each intersection boundary.

13. A system for refining a configuration used by a video analysis system for analyzing videos, the system comprising a processor and memory, the memory comprising computer executable instructions for causing the processor to:
- deploying the configuration to at least one video capturing device positioned to capture a video of a scene, the configuration including a spatial arrangement of a first set of one or more elements within the scene, a region of interest including the first set of one or more elements defined within the scene for analyzing the video, and one or more of settings and parameters associated with the video and the video capturing device, wherein the region of interest comprises at least one roadway or traffic intersection;
- receiving video data from the at least one video capturing device, the video data including data associated with one or more of objects detected within the scene;
- assigning a label to each of the one or more objects detected within the scene, the label being indicative of a type of the object;
- determining a movement pattern for each type of object based on the data associated with the one or more objects detected within the scene;
- refining the spatial arrangement of the first set of one or more of the elements within the scene based on the determined movement patterns corresponding to each type of objects;
- identifying one or more areas within the scene indicating changes to the scene over time based on the received data associated with the objects, wherein the identified one or more areas include elements not included in the first set of one or more elements from the region of interest as defined within the deployed configuration;
- refining the region of interest to include a second set of one or more elements that include the elements not included in the first set of one or more elements based on the changes to the scene in the identified one or more areas to generate a refined region of interest;
- adjusting the one or more of the settings and parameters associated with the video and the video capturing device based on the refined spatial arrangement and the refined region of interest to generate a refined configuration for use in analyzing videos; and
- deploying the refined configuration to the at least one video capturing device.

14. The system of claim 13, further comprising iterating at least once to further refine the configuration.

15. The system of claim 13, further comprising instructions to cause the processor to use the refined configuration in at least one downstream data consumption process.

16. The system of claim 13, wherein the configuration is automatically refined by:
- creating vehicle tracks from the data received from the at least one video capturing device;
- clustering the vehicle tracks to represent desired movements, using at least one feature;
- further clustering the clustered vehicle tracks to separate movements into lanes and generate an initial configuration;
- mapping each cluster to an element in the configuration;
- manipulating the configuration elements to improve the representation of the tracks; and
- confirm the configuration for deployment.

17. The system of claim 16, further comprising instructions to enable a manual approval of the created configuration elements.

18. The system of claim 16, wherein the boundaries are inferred by:
- collecting primary directions of tracks;
- determining a number of entrances and exits from the primary track directions;
- determining entrance and exit locations from real-world constraints on the tracks; and
- identifying the entrances and exits along each intersection boundary.

19. The system of claim 13, further comprising instructions for automatically generating the configuration prior to deploying the configuration by:
- deploying at least one video device without an existing configuration;
- running at least one computer vision algorithm to detect vehicles and assign labels;
- receiving data from the at least one video capturing device; and
- automatically generating the configuration to be deployed to the at least one video capturing device.

20. A non-transitory computer readable medium storing process-executable instructions for refining a configuration used by a video analysis system for analyzing videos that, when executed by a processor, cause the processor to:
- deploying the configuration to at least one video capturing device positioned to capture a video of a scene, the configuration including a spatial arrangement of a first set of one or more elements within the scene, a region of interest including the first set of one or more elements defined within the scene for analyzing the video, and one or more of settings and parameters associated with the video and the video capturing device, wherein the region of interest comprises at least one roadway or traffic intersection;
- receiving video data from the at least one video capturing device, the video data including data associated with one or more of objects detected within the scene;
- assigning a label to each of the one or more objects detected within the scene, the label being indicative of a type of the object;
- determining a movement pattern for each type of object based on the data associated with the one or more objects detected within the scene;
- refining the spatial arrangement of the first set of one or more of the elements within the scene based on the determined movement patterns corresponding to each type of objects;
- identifying one or more areas within the scene indicating changes to the scene over time based on the received data associated with the objects, wherein the identified one or more areas include elements not included in the first set of one or more elements from the region of interest as defined within the deployed configuration;

refining the region of interest to include a second set of one or more elements that include the elements not included in the first set of one or more elements based on the changes to the scene in the identified one or more areas to generate a refined region of interest;

adjusting the one or more of the settings and parameters associated with the video and the video capturing device based on the refined spatial arrangement and the refined region of interest to generate a refined configuration for use in analyzing videos; and deploying the refined configuration to the at least one video capturing device.

\* \* \* \* \*